United States Patent
Shoop

(10) Patent No.: US 12,003,824 B2
(45) Date of Patent: *Jun. 4, 2024

(54) SYSTEMS AND METHODS FOR DISPLAYING NOTIFICATIONS OF ANTICIPATED DYNAMIC EVENTS ON A MEDIA PROGRESS INDICATOR

(71) Applicant: Rovi Guides, Inc., San Jose, CA (US)

(72) Inventor: David D. Shoop, San Jose, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,264

(22) Filed: Apr. 5, 2023

(65) Prior Publication Data

US 2023/0247265 A1  Aug. 3, 2023

Related U.S. Application Data

(63) Continuation of application No. 17/483,952, filed on Sep. 24, 2021, now Pat. No. 11,653,068, which is a continuation of application No. 16/899,995, filed on Jun. 12, 2020, now Pat. No. 11,159,855, which is a continuation of application No. 16/045,349, filed on Jul. 25, 2018, now Pat. No. 10,715,874.

(51) Int. Cl.
| | |
|---|---|
| *H04N 21/488* | (2011.01) |
| *H04N 21/458* | (2011.01) |
| *H04N 21/472* | (2011.01) |
| *H04N 21/478* | (2011.01) |

(52) U.S. Cl.
CPC ........ *H04N 21/488* (2013.01); *H04N 21/458* (2013.01); *H04N 21/47217* (2013.01); *H04N 21/478* (2013.01)

(58) Field of Classification Search
CPC ............. H04N 21/4316; H04N 21/458; H04N 21/47217; H04N 21/478; H04N 21/488; H04N 21/4882
See application file for complete search history.

(56) References Cited

U.S. PATENT DOCUMENTS

| | | | | |
|---|---|---|---|---|
| 6,543,051 B1 * | 4/2003 | Manson | ............... | G08B 27/008 |
| | | | | 725/108 |
| 6,684,240 B1 * | 1/2004 | Goddard | ............ | H04N 21/4751 |
| | | | | 707/999.005 |

(Continued)

*Primary Examiner* — Michael B. Pierorazio
(74) *Attorney, Agent, or Firm* — Haley Guiliano LLP

(57) ABSTRACT

Systems and methods for tracking the status of an anticipated dynamic event and displaying a corresponding notification icon on a media progress indicator. A media guidance application receives, from an application (e.g., Uber), a notification (e.g., "Driver Found") during consumption of a media asset (e.g., "Fast and Furious") and determines that an expected event without a fixed time of occurrence will happen (e.g., arrival of driver at user's location). The media guidance application determines an anticipated time of the expected event and generate a visual icon representing the expected event on the media asset's consumption progress indicator at the anticipated time relative to the consumption (e.g., 56-minute mark of the movie). As updated information (e.g., traffic, driver's route, etc.) is received, the media guidance application recalculates the anticipated time and shift the visual icon based on the new calculation.

20 Claims, 10 Drawing Sheets

(56) References Cited

U.S. PATENT DOCUMENTS

| | | | |
|---|---|---|---|
| 7,165,098 B1 | 1/2007 | Boyer et al. | |
| 7,353,466 B2 | 4/2008 | Crane et al. | |
| 7,602,277 B1* | 10/2009 | Daly | G08B 27/005 |
| | | | 455/414.3 |
| 7,643,564 B2* | 1/2010 | Sheynman | H04L 63/10 |
| | | | 725/38 |
| 7,681,215 B2* | 3/2010 | Kim | H04N 21/4383 |
| | | | 725/71 |
| 7,761,892 B2 | 7/2010 | Ellis et al. | |
| 7,870,279 B2* | 1/2011 | Chuang | H04L 9/40 |
| | | | 725/35 |
| 8,046,801 B2 | 10/2011 | Ellis et al. | |
| 8,250,598 B2* | 8/2012 | Velazquez | H04N 21/6405 |
| | | | 725/35 |
| 8,532,607 B2* | 9/2013 | Sennett | H04W 4/02 |
| | | | 340/539.18 |
| 8,572,645 B2* | 10/2013 | Kim | H04H 20/82 |
| | | | 725/38 |
| 8,745,655 B2* | 6/2014 | Reddy | H04N 21/814 |
| | | | 725/31 |
| 9,106,976 B2* | 8/2015 | Emerson | H04N 5/782 |
| 9,681,165 B1 | 6/2017 | Gupta et al. | |
| 10,715,874 B2 | 7/2020 | Shoop | |
| 11,653,068 B2 | 5/2023 | Shoop | |
| 2001/0021994 A1* | 9/2001 | Nash | H04N 7/163 |
| | | | 348/E5.122 |
| 2002/0083468 A1* | 6/2002 | Dudkiewicz | H04N 21/4755 |
| | | | 348/473 |
| 2002/0124252 A1* | 9/2002 | Schaefer | H04N 21/6131 |
| | | | 348/E7.071 |
| 2002/0129368 A1* | 9/2002 | Schlack | H04N 21/44016 |
| | | | 348/E7.071 |
| 2002/0174430 A1 | 11/2002 | Ellis et al. | |
| 2002/0188944 A1* | 12/2002 | Noble | H04N 21/812 |
| | | | 725/39 |
| 2002/0188949 A1* | 12/2002 | Wang | H04N 21/4668 |
| | | | 725/50 |
| 2003/0018977 A1* | 1/2003 | McKenna | H04N 21/462 |
| | | | 725/115 |
| 2003/0066069 A1* | 4/2003 | Mankovich | H04N 21/4431 |
| | | | 725/9 |
| 2003/0114968 A1 | 6/2003 | Sato et al. | |
| 2003/0216133 A1* | 11/2003 | Poltorak | G08B 27/008 |
| | | | 455/404.1 |
| 2005/0055685 A1* | 3/2005 | Maynard | H04N 21/8193 |
| | | | 717/122 |
| 2005/0086685 A1* | 4/2005 | Rahman | H04L 9/40 |
| | | | 340/531 |
| 2005/0251827 A1 | 11/2005 | Ellis et al. | |
| 2006/0234672 A1* | 10/2006 | Adler | H04W 76/50 |
| | | | 455/404.1 |
| 2007/0047520 A1* | 3/2007 | Byers | H04M 7/006 |
| | | | 370/352 |
| 2007/0121651 A1* | 5/2007 | Casey | H04L 67/565 |
| | | | 370/466 |
| 2007/0150273 A1* | 6/2007 | Yamamoto | G10L 15/22 |
| | | | 704/E15.04 |
| 2007/0280446 A1* | 12/2007 | Hsieh | H04L 12/66 |
| | | | 379/93.23 |
| 2008/0134043 A1* | 6/2008 | Georgis | H04L 67/104 |
| | | | 348/E7.071 |
| 2009/0150925 A1* | 6/2009 | Henderson | H04N 7/163 |
| | | | 725/34 |
| 2009/0158382 A1* | 6/2009 | Shaffer | H04N 21/4825 |
| | | | 725/131 |
| 2009/0217324 A1* | 8/2009 | Massimi | H04H 60/46 |
| | | | 725/9 |
| 2009/0239497 A1* | 9/2009 | Sennett | H04W 4/90 |
| | | | 455/404.1 |
| 2009/0247110 A1* | 10/2009 | Sennett | H04W 4/90 |
| | | | 340/539.1 |
| 2009/0247114 A1* | 10/2009 | Sennett | H04W 76/50 |
| | | | 455/404.1 |
| 2009/0247116 A1* | 10/2009 | Sennett | H04W 4/90 |
| | | | 455/404.2 |
| 2009/0300695 A1* | 12/2009 | White | H04N 5/76 |
| | | | 725/109 |
| 2010/0058395 A1* | 3/2010 | Goergen | H04N 21/4516 |
| | | | 725/58 |
| 2010/0060789 A1* | 3/2010 | Aoki | G09G 5/14 |
| | | | 725/33 |
| 2010/0186029 A1* | 7/2010 | Kim | H04H 20/93 |
| | | | 725/33 |
| 2010/0332282 A1 | 12/2010 | Bradley et al. | |
| 2011/0088058 A1* | 4/2011 | Velazquez | H04N 21/64322 |
| | | | 725/33 |
| 2011/0126251 A1* | 5/2011 | LaFreniere | H04N 21/4788 |
| | | | 725/110 |
| 2011/0126257 A1* | 5/2011 | Goergen | H04N 21/4532 |
| | | | 725/132 |
| 2011/0131604 A1* | 6/2011 | Van Hoff | H04N 21/4112 |
| | | | 725/38 |
| 2012/0102522 A1* | 4/2012 | Long | H04W 76/50 |
| | | | 725/33 |
| 2013/0274936 A1* | 10/2013 | Donahue | H02J 13/00034 |
| | | | 700/291 |
| 2013/0281047 A1* | 10/2013 | Daly | H04H 20/71 |
| | | | 455/404.1 |
| 2014/0148116 A1* | 5/2014 | Alman | H04W 4/90 |
| | | | 455/404.1 |
| 2014/0244997 A1* | 8/2014 | Goel | H04W 12/084 |
| | | | 713/155 |
| 2015/0228000 A1 | 8/2015 | Bijor et al. | |
| 2015/0350746 A1 | 12/2015 | Tomita | |
| 2016/0232579 A1 | 8/2016 | Fahnestock | |
| 2018/0088749 A1 | 3/2018 | Yamashita et al. | |
| 2020/0037038 A1 | 1/2020 | Shoop | |
| 2020/0404385 A1 | 12/2020 | Shoop | |
| 2022/0014825 A1 | 1/2022 | Shoop | |

\* cited by examiner

700

702 — Determine a Notification Type of the First Notification

704 — Retrieve, from Memory, a History of Notifications of the Determined Notification Type Generated by the Application 706 — Calculate, Based on the History of Notifications, an Average Time Difference Between a Time When an Initial Notification was Received and a Time When a Follow-up Notification to the Initial Notification was Received 708 — Determine that the Anticipated Time of the Expected Event is a Sum of the Average Time Difference and a Time When the First Notification was Received

802 — Determine that the Updated Information Comprises Expected Route Information 804 — Calculate an Expected Travel Time to Navigate a Route Specified by the Expected Route Information 806 — Determine that the Updated Anticipated Time of the Expected Event is a Sum of the Expected Travel Time and a Time When the Updated Information was Received

FIG. 8

SYSTEMS AND METHODS FOR DISPLAYING NOTIFICATIONS OF ANTICIPATED DYNAMIC EVENTS ON A MEDIA PROGRESS INDICATOR

CROSS-REFERENCE TO RELATED APPLICATIONS

This application is a continuation of U.S. patent application Ser. No. 17/483,952, filed Sep. 24, 2021, which is a continuation of U.S. patent application Ser. No. 16/899,995, filed Jun. 12, 2020, (now U.S. Pat. No. 11,159,855), which is a continuation of U.S. patent application Ser. No. 16/045,349, filed Jul. 25, 2018, (now U.S. Pat. No. 10,515,874), the disclosures of each application are incorporated by reference in their entireties.

BACKGROUND

The advancement of digital transmission of media content has improved accessibility and increased consumption of media content. Likewise, there has been an increase in the development of applications for smart devices. As applications compete to grab users' attentions through notifications, conventional media systems are plagued by busy and clunky interfaces that overwhelm users with information. In particular, conventional media systems fail to provide a clean way of seamlessly integrating the display of notifications with a user's regular activities such as when consuming media content.

SUMMARY

The integration of notifications into media consumption may influence users in the way they consume media content. By informing users of when events have occurred, or are expected to occur, users can properly judge when to begin consuming media, when to stop, how to access the media, etc. Accordingly, systems and methods are described for tracking the status of a dynamic event and displaying a corresponding notification icon on a media progress indicator. In one exemplary embodiment, a user may be watching a movie on his smartphone. The smartphone may receive a notification generated by an application (e.g., Uber™) confirming that a requested driver is headed to the user's location. A media guidance application may parse the notification and determine that a dynamic event (e.g., the arrival of the Uber™ ride at the user's location) is expected to occur. Here, the term "dynamic" implies that the event is not set to occur at a fixed time and can be delayed or expedited based on various known and unknown variables. In this scenario, these variables may include traffic, weather, commuting regulations, any other variable that may affect the time of arrival, or any combination thereof.

The media guidance application may proceed to estimate the anticipated time of occurrence of the dynamic event and generate a visual icon representing the anticipated time of occurrence on the media playback progress bar of the movie the user is watching. For example, the estimated anticipated time of occurrence may be 4:00 pm. The media guidance application may determine that at 4:00 pm, if the user continues watching the movie in normal playback mode, the user will have watched 62 minutes of the movie. Accordingly, the media guidance application will generate a visual icon at the 62-minute mark on the progress bar. The visual icon may be shifted around on the progress bar as the media guidance application receives more information about the status of the event. The visual icon enhances the user interface by providing the user with a visual aid for identifying when an event is set to occur in reference to the user's viewing activity. Displaying a basic notification indicating that the expected event is set to occur at 4:00 pm is not efficient because users are not expected to constantly refer to a clock to check the current time and compare it with 4:00 pm. Tying the notifications to the progress bar provides the user with a sense of time as linked by the consumption (e.g., playback) of the media asset. Thus, users can identify events and alter their media consumption experience directly based on information in the media playback progress bar.

In some aspects, a media guidance application may receive, from an application, a first notification during consumption of a media asset. In some embodiments, the media asset may be a video, an audio clip, a slideshow of images, a video game, digital information, or any other type of media. Each media asset may be associated with a progress indicator that describes the user's duration of consumption and/or progression through the media asset. For example, if the user is watching a live broadcast on his/her set-top box, the progress indicator may be a temporal progress bar that allows the user to view the tentative duration of the event. If the user is accessing a video game, the progress indicator may be a visual monitor that informs the user of how much of the video game the user has completed (e.g., 70% of the main storyline). If the user is viewing exercise information while exercising on a fitness machine (e.g., a cardio bike), the progress indicator may inform the user of the physical distance the user has pedaled. If the user is consuming a movie, the progress indicator may be a playback progress bar.

In one example, a user may be using a video-streaming service such as Netflix™ to view the movie "Fast and Furious." During playback of "Fast and Furious," the user may receive a notification from a taxi-delivery application such as Uber™. A notification may be any information that is generated for the user at a given time. In one exemplary embodiment, a notification may be generated by an application to alert the user about a status of an event. For example, the user may have requested a taxi via Uber™. The first notification may indicate that a driver has accepted the user's request and the taxi is on its way to the user's location. In this example, there are two applications to consider. The first is the Netflix™ application on which the user is streaming "Fast and Furious," and the second is the Uber™ application from which the notification is received. To ultimately generate for display notifications from the Uber™ application on the Netflix™ application, the media guidance application monitors incoming notifications and bridges communication between the respective applications and various devices. Thus, even if the user is viewing "Fast and Furious" and requesting a taxi on different devices (e.g., a set-top box and a smartphone, respectively), the media guidance application monitors incoming notifications on both devices, receives the notification on the smartphone, determines that the user is viewing media on the set-top box, and transmits the notification to the set-top box, accordingly. In some embodiments, the applications may be merged (e.g., Uber™ built-in the Netflix™ application).

The media guidance application may determine, based on information from the first notification, that an expected event will occur at a future time. In some embodiments, the expected event may not have a fixed time of occurrence. In the previous example, the first notification was received in response to the user's request for a taxi. The first notification indicated that a driver accepted the request and is travelling to the user. In this scenario, the user requested a taxi at his/her location, the first notification is an acknowledgment of the user's request, and the resolution to the user's request is the arrival of the taxi. Accordingly, the media guidance application may determine that the user's request is resolved in response to the arrival of the taxi and may identify the arrival as the expected event. Furthermore, the media guidance application may determine the type of request the user has made and the likelihood of the request being resolved by a fixed time. For example, the media guidance application may refer to a predetermined database that lists various types of requests (e.g., vehicular, alarm, appointment, shopping, meeting, recording, etc.) and whether they can be resolved in a fixed time. An example of a fixed time event is an alarm request. In this case, the user may request a smart speaker (e.g., a Google™ Home) to wake him/her up at 6:00 am. The first notification may be the Google™ Home audibly indicating "Ok, I will wake you up at 6:00 am." In this example, the expected event is the Google™ Home ringing the alarm exactly at 6:00 am. Thus, the predetermined database may indicate that an alarm request is associated with fixed times. In the case of a vehicular request, expected events such as departures and arrivals, may be affected variables such as traffic and weather that may cause expected events to be delayed or expedited. Therefore, the predetermined database may indicate that vehicular requests are subject to time adjustments.

In some embodiments, some notifications may be initiated by something other than a user request. For example, the user may receive a text from a friend stating, "I will leave my place in 5 minutes and head your way." The media guidance application may identify the text as the first notification. In this example, this is the first text exchanged between the user and the friend (e.g., the user did not text beforehand requesting the friend's commute status). In some embodiments, in order to determine, based on information from the first notification, that the expected event will occur at the future time, the media guidance application may first parse textual information from the first notification. The media guidance application may use natural language processing to interpret the friend's text. In some cases, the media guidance application may first convert mediums such as audio (e.g., a voicemail message, a phone call, etc.) to text. When parsing the textual information, the media guidance application may identify keywords such as verbs, nouns, and numbers. In the friend's text, the media guidance application may identify words: "will," "leave," "my place," "5 minutes," "head" and "your way." The media guidance application may determine, based on the parsing, that the textual information comprises at least one verb in a future tense. For example, the media guidance application may determine that "will," "leave," and "head" are verbs. the media guidance application may determine that the verb "will" indicates a future tense based on a dictionary lookup. In response to determining that the textual information comprises at least one verb in the future tense, the media guidance application may determine that the expected event will occur at the future time. By using natural language processing, the media guidance application may further determine that the expected event, based on "will leave my place in 5 minutes" is the friend leaving his location. In addition, the media guidance application may identify a second expected event based on "head your way," which involves the friend's arrival at the user's location.

In some embodiments, the media guidance application may determine, based on information from the first notification, that the expected event will occur at the future time by first determining a notification type of the first notification. The media guidance application may classify the first notification based on the application that generated the notification and the content of the notification. The classifications of the notification type may be "general notification" (e.g., user's photo received a comment on social media), "query notification" (e.g., a text asking, "when are you arriving?"), "confirmation notification" (e.g., an email stating "your shopping order is confirmed") and "resolution notification" (e.g., an alert stating "your package has been delivered"). When classifying a notification, the media guidance application may search the text of the notification for keywords such as "confirmation," "received," "request," "complete," "status," etc. The media guidance application may also search for punctuation such as question marks. Alongside the classification, the notification type may also indicate the application name. In the one example, the first notification generated by the Uber™ application indicates that a driver is headed toward the user. Because the notification is received in response to a user request, the media guidance application may determine the notification type to be "Uber™—confirmation notification." In some embodiments, the notification type may be more detailed. For example, the notification type may include a description section and thus may appear as "Uber™—confirmation notification—driver found."

The media guidance application may retrieve, from memory, a history of notifications of the determined notification type generated by the application. The history of notifications may be a data structure that lists notifications delivered to the user, the devices on which the notifications were delivered, the applications that generated the notifications, the respective notification types, etc. For example, the media guidance application may perform a search for previous notifications with the notification type "Uber™—confirmation notification—driver found." This retrieval may be specific to the user's devices (e.g., the user may have used the Uber™ application on his/her smartphone and/or through his/her smart speaker). The media guidance application may determine, based on the history of notifications, a rate at which follow-up notifications were received from the application after receiving a notification of the determined notification type. The follow-up notification may be a notification tied to the first notification. For example, if the notification type is "query notification" or "confirmation notification," the follow-up notification may be a "resolution notification" indicating that an event has occurred resolving the query or confirmation of an event.

The media guidance application may utilize machine learning techniques (e.g., binary classification) to determine whether a notification that follows the first notification is a follow-up notification to the first notification of the notification type. Specifically, the media guidance application may identify notification chains generated by various applications. For example, a notification chain for an Uber™ taxi request may involve receiving confirmation of a driver accepting the user's request, receiving an alert that the driver has arrived at the user's location, and receiving confirmation that the trip has ended. Based on the notification chains, the media guidance application may determine whether a notification is a follow-up notification. This prevents notifications unrelated to the content of the first notification from being classified as a follow-up notification. Thus, a general notification (e.g., a coupon for a ride) may not be considered a follow-up notification because it is not part of the notification chain.

The rate at which the follow-up notifications were received may be determined for a given time period. For example, in response to retrieving the history of notifications, the media guidance application may identify, out of 100 notifications listed as the notification type "Uber™—confirmation notification—driver found," there are 99 notifications indicating the arrival of the driver at the user's location (e.g., a "resolution notification"). The media guidance application may perform a search specific to a time period "within the past month." Based on the dates of notification delivery in the history of notifications, the media guidance application may identify, out of 10 notifications, 10 notifications indicating the arrival of the driver. In the first example, the rate is 99% and in the second example, the rate is 100%. The media guidance application may retrieve from memory a threshold rate, which represents the minimum rate for which the media guidance application can anticipate a follow-up notification of an expected event. In response to determining that the rate at which the follow-up notification was received is greater than the threshold rate (e.g., 75%), the media guidance application may determine that the expected event will occur at the future time. For example, if the minimum rate is 80%, the media guidance application will anticipate the expected event given the higher rates determined from the history of notifications.

In response to determining that the expected event will occur, the media guidance application may determine an anticipated time of the expected event. For example, the media guidance application may anticipate that the expected event (e.g., the arrival of the driver) will occur based on the initial notification. The media guidance application may proceed to therefore determine when the expected event will happen. The anticipated time of the expected event may be described by the day and time (e.g., Jun. 15, 2018 at 4:00 pm). In some embodiments, the media guidance application may determine the anticipated time of the expected event by determining a notification type of the first notification. After determining the notification type (e.g., "Uber™—confirmation notification—driver found"), the media guidance application may retrieve, from memory, a history of notifications of the determined notification type generated by the application. Based on the history of notifications, the media guidance application may calculate an average time difference between a time when an initial notification (e.g., the first notification) was received and a time when a follow-up notification to the initial notification was received. For example, the media guidance application may determine that the average time difference between when a driver accepted the user's request for a taxi and when the driver arrived at the user's location is 6 minutes 34 seconds over 100 notification and follow-up notification pairs. In some embodiments, the average time difference may be calculated based on: mean of all times between the respective notifications, standard deviation, mode, etc. The media guidance application may determine that the anticipated time of the expected event is a sum of the average time difference and a time when the first notification was received. For example, the first notification may have been received on Jun. 15, 2018 at 3:00 pm. The anticipated time of the event may therefore be calculated as Jun. 15, 2018 at 3:06:34 pm.

The media guidance application may generate, for display on a progress indicator associated with the consumption of the media asset, a dynamic notification icon at a first position. As mentioned previously, the user may be viewing "Fast and Furious" on the Netflix™ application of the user's set-top box. The progress indicator may therefore be an overlaid playback progress bar displaying a current playback position icon and a bar representing the duration of the media asset. The dynamic notification icon may be any visual indicator that specifies information such as a playback or consumption position. The first position is indicative of the anticipated time of the expected event relative to the consumption of the media asset. For example, the current playback position of the user may be 56 minutes into the movie "Fast and Furious." The real time while the user is at the 56-minute mark may be 3:00 pm. Accordingly, the media guidance application may receive the first notification and determine the anticipated time of the event to be at 3:06:34 pm. The media guidance application may determine that at 3:06:34 pm, if the user continues watching the movie in normal playback mode, the user will have watched 62 minutes 34 seconds of "Fast and Furious." Accordingly, the media guidance application will generate the dynamic notification icon on the first position, which is 62 minutes 34 seconds, on the progress bar. In some embodiments, the media guidance application may also generate for display a first notification icon on the progress indicator (e.g., at the 56-minute mark of the playback progress bar) in response to receiving the first notification. In a different example where the user is playing a video game (e.g., Need for Speed), the media guidance application may generate, for display, the user's progress in the video game as the progress indicator. In the case of a racing game for example, the user progress indicator may be a visual indicator of the user's race measured in laps. Thus, if the media guidance application anticipates the occurrence of an expected event, the media guidance application may generate a dynamic notification icon relative to the user's progress in the race (e.g., based on the user's current speed and the map size, the expected event will occur around the time when the user finishes the second lap of the video game race). In this scenario, the dynamic notification icon may be placed on a mini-map that is typically depicted in racing video games. In yet another example, if the user is exercising on an exercise bike and is measuring his/her progress (e.g., the distance pedaled, the duration of the exercise, the heart rate), the media guidance application may detect a progress indicator associated with the exercise and generate for display the dynamic notification icon of the expected event. For example, the exercise bike may depict an animation/visual status bar on the screen representing the distance the user has traveled. Based on the user's speed and consistency, the media guidance application may generate a dynamic notification icon indicating that the user has currently pedaled 0.5 miles and the expected event is anticipated to occur when the user will have pedaled 1 mile.

These visual indicators (i.e., the first notification icon and the dynamic notification icon) enhance the user interface by providing the user with meaningful visual aids for identifying when an event is set to occur in relation to the user's media consumption activity. As mentioned before, receiving a notification indicating that the expected event is set to occur at 3:06:34 pm is not useful to a user. The user is forced to constantly check the current time and compare it with 3:06:34 pm. Tying the notifications to the progress indicator provides the user with a sense of time as linked by the consumption of the media asset. For example, if the user has watched 56 minutes of a movie, and the user interface displays a notification at a position on the progress bar that is indicative of the 62-minute position in the movie, the user interface will make the user immediately aware that the expected event will occur in 6 minutes without the need for a user to consult a clock. Similarly, if the user is playing a racing video game and is notified, via the user interface, that the expected event will occur when the user finishes the second lap of a race, the user will have a better sense of when the expected event will occur.

Prior to the expected event, the media guidance application may receive from the application, updated information associated with the expected event. The updated information may be information directly from the application (e.g., a status update, cancellation, etc.). The updated information may also be from another resource such as the Internet, a second application, or a database. In the Uber™ example, the updated information from the Uber™ application may be a text or call from the driver, a cancellation, a new driver replacing the old one, the driver's route, the vehicle information, etc. The updated information from a secondary source may be traffic details, the news, weather information, etc.

The media guidance application may determine an updated anticipated time of the expected event based on the updated information associated with the expected event. For example, the driver may call the user at 3:02 pm stating that he/she will arrive after dropping off a current passenger whose destination is on the route to the user's location. The media guidance application may utilize natural language processing to interpret the driver's statement, identify that the driver is occupied and may be delayed, and add a predetermined delay time of one minute to account for the taxi stopping to drop off the current passenger. Thus, the updated anticipated time of the expected event may be 3:07:34 pm. The predetermined delay time may be retrieved from a database that associates variables across various applications with time adjustments.

In some embodiments, the media guidance application may determine the updated anticipated time of the expected event, based on the updated information, by first determining that the updated information comprises expected route information. For example, the Uber™ application provides GPS information of the driver's location to users. The GPS information allows users to view the route the driver is taking. The media guidance application may calculate an expected travel time to navigate a route specified by the expected route information. The media guidance application may use a secondary source, such as the Internet, to identify local traffic, weather issues, and the news to estimate the expected travel time to travel the route the driver is taking to get to the user. For example, the news may indicate that a parade is set to occur near the user's area and several streets will be closed off. Traffic conditions may be poor in the user's area, causing delay times of 5 minutes for all vehicles. Taking into account the driver's route and the updated information from the secondary source, the media guidance application may utilize a probabilistic algorithm that is a function of travel route, traffic, weather, and commuting information (e.g., retrieved from the news), to determine most likely travel time. In some cases, the media guidance application may also utilize machine learning techniques (e.g., collaborative filtering) to determine the time adjustments to apply for each variable (e.g., streets covered in snow cause for 2 minutes of additional travel time). For example, given the updated information retrieved from the Uber™ application and the Internet, the media guidance application may determine that the expected travel time is 8 minutes. The expected travel time may be updated in real-time as additional updated information is received by the media guidance application. The media guidance application may determine that the updated anticipated time of the expected event is a sum of the expected travel time and the time when the updated information was first received subsequent to receiving the first notification. For example, if the first notification was received at 3:00 pm and the updated information indicating the driver's status was received 3:01 pm, the updated anticipated time of the expected event may be 3:09 pm (e.g., summing 3:09 pm with 8 minutes). It should be noted that the updated information may be received along with the first notification.

In some embodiments, the media guidance application may determine the updated anticipated time of the expected event, based on the updated information, by first determining that the updated information comprises a delay time value associated with an occurrence of the expected event. Not all application notifications are associated with travel. For example, the user may be waiting for a doctor's appointment or for the installation of a software program. In these situations, the media guidance application may anticipate a resolution notification indicating that the doctor can see the user or that the software program has been installed. Delays for these respective scenarios may involve the doctor taking too long with the current patient and the processing power for installing the software program being reallocated to start another program. In the case of the doctor, certain hospitals may provide applications to users to set appointments and directly message their doctors. Accordingly, the user may receive, via the hospital's application, a message from the user's doctor indicating that he needs an additional 5 minutes before he can attend to the user. The delay time value may thus become 5 minutes. The original anticipated time of the expected event (e.g., the appointment) may be 4:00 pm. In view of the doctor's message, the media guidance application may determine that the updated anticipated time of the expected event is a sum of the anticipated time of the expected event (4:00 pm) and the delay time value (5 minutes). In this example, the updated anticipated time of the expected event is 4:05 pm.

It should be noted that the techniques described above for determining the updated anticipated time of the expected event may also be used to determine the anticipated time of the expected event. Likewise, the techniques described for determining the anticipated time of the expected event may be used to determine the updated anticipated time of the expected event. In some embodiments, the user may provide input to the media guidance application indicating the actual time of the expected event (e.g., when the driver actually ended up arriving at the user's location). In response, the media guidance application may use the input as training data to improve its machine learning and probabilistic modelling. For example, given the actual time of the expected event, the media guidance application may apply appropriate weights and implement time adjustments to improve delay time estimates with respect to news, traffic, weather, route, etc. This may ultimately improve the initial calculation of the anticipated time of the expected event and, as will be discussed, may minimize the shifting of the dynamic notification icon.

The media guidance application may compare the anticipated time of the expected event and the updated anticipated time of the expected event. Considering the taxi request example, the media guidance application determined the anticipated time of the expected event to be 3:06:34 pm and the updated anticipated time of the event to be 3:09 pm. In response to determining that the anticipated time of the expected event and the updated anticipated time of the expected event do not match, the media guidance application may shift the dynamic notification icon to a second position on the progress indicator. In some embodiments, the second position is indicative of the updated anticipated time of the expected event relative to the consumption of the media asset. Because 3:06:34 pm and 3:09 pm are different times, the media guidance application may determine the second position on the progress indicator. In this example, the current time may be 3:01 pm and the current playback position may be 57 minutes. The media guidance application may determine the difference between 3:09 pm and 3:01 pm to be 8 minutes and add 8 minutes to the current playback position. Accordingly, the media guidance application may determine the second position to be 65 minutes, the sum of the respective time values. The media guidance application may move the dynamic notification icon from the 62-minute 34-second mark to the 65-minute mark on the progress indicator (e.g., the playback progress bar) of "Fast and Furious."

In some embodiments, the media guidance application may receive updated information in real-time (e.g., the driver's route). As a result, the media guidance application may generate a data structure (e.g., an array, linked list, stack, etc.) to store the updated anticipated times of the expected event. For example, the media guidance application may determine, at a first time, that the updated information indicates a delay of 5 minutes. At a second time, later than the first time and before the time of the expected event, the media guidance application may receive more updated information indicating a reduction in the delay to 2 minutes. In this embodiment, the dynamic notification icon is shifted in real-time and the latest updated anticipated time of the expected event is compared with the previously calculated updated anticipated time rather than the anticipated time (e.g., the first calculation of the anticipated time). In order to save processing, the media guidance application may retrieve updated information after a period of time (e.g., every 2 minutes) and recalculated the updated anticipated time of the expected event.

In some embodiments, the media guidance application may determine a start playback time and an end playback time for an important scene of the media asset. For example, the media guidance application may retrieve metadata associated with the movie "Fast and Furious." The media guidance application may identify a scene in the movie that contains an attribute (e.g., the appearance of an actor) that matches the user's preference (e.g., the user likes to watch the actor based on his/her viewing history). In response to determining that the scene includes an actor the user likes, the media guidance application may determine that the scene is an important scene. Importance scenes may also be popular scenes that several people have watched. For example, the important scene may be a race scene at the climax of the movie. Based on the metadata of the movie, the media guidance application may determine that the start playback time is 60 minutes and the end playback time is 68 minutes into the movie. The media guidance application may determine that the second position of the dynamic notification icon is at the start playback time or between the start playback time and the end playback time. In one example, the second position may be 65 minutes or equivalent (e.g., in percentage or fraction) on the progress indicator. Therefore, the media guidance application may determine that the second position within the start and end playback times of the important scene. In order to prevent the expected event from interrupting the scene, the media guidance application may determine a time difference between the second position and the end playback time. For example, the time difference between the second position (e.g., 65 minutes) and the end playback time (e.g., 68 minutes) is 3 minutes. The media guidance application may send a request to the application to delay the expected event by the time difference. For example, the media guidance application may inform the Uber™ application to inform (e.g., via an in-app alert, a text, and/or a call) the driver to wait an additional 3 minutes for the user. This would allow the user to finish viewing the important scene in the media asset. In some embodiments, in response to receiving, from the application, an acknowledgment of the request to delay the expected event by the time difference, the media guidance application may shift the dynamic notification icon on the progress indicator from the second position to the end playback time. For example, the Uber™ application may generate a message indicating that the driver has been informed of the user's instructions and will wait an extra 3 minutes. As a result, the media guidance application may shift the dynamic position icon to the end playback time (e.g., 68 minutes). In the event that the driver cannot provide acknowledgement, the user may be alerted to pause the important scene. In some embodiments, in place of an acknowledgment, the media guidance application may receive a time delay value from the application. For example, the driver may message user saying that he/she can only wait for one minute. In response, the user may be alerted of the important scene and the media guidance application may shift the dynamic notification icon to a third position that is one minute after the second position (e.g., to account for the driver's conditions).

In some embodiments, the media guidance application may receive a trick play command to pause consumption of the media asset. For example, the user may pause "Fast and Furious" on his/her set-top box. In response to pausing consumption, the media guidance application may calculate a pause time value based on an amount of time the media asset was paused. For example, the media guidance application may initiate a timer once the media asset is paused. In this example, at 3:02 pm, the user may leave the media asset paused for 5 minutes at the 58-minute mark of the movie "Fast and Furious." The media guidance application may receive a second trick play command to resume consumption at 3:07 pm. If the updated anticipated time of the expected event is at 3:09 pm, the media guidance application may determine that relative to the consumption of the media asset, the expected event will occur at the 60-minute mark (e.g., 2 minutes from the pause position), rather than the 65-minute mark. The media guidance application may shift the dynamic notification icon on the progress indicator to a third position, wherein the third position (e.g., the 60-minute mark) precedes the second position (e.g., the 65-minute mark) by the pause time value (e.g., 5 minutes). In some embodiments, rather than waiting for the user to provide the command to resume consumption, the media guidance application may update the position of the dynamic notification icon in real-time. Thus, as the timer measures the pause duration, the dynamic notification icon shifts closer to the current consumption position. In another example, the trick play command may be to pause a video game the user is accessing. In another example, if the user is exercising on a bike, a trick play command may be considered a change in the user's exercise (e.g., the user enters a more rigorous mode of training) or the user taking a break.

In some embodiments, the trick play command may be fast forward, rewind, alter playback speed, etc. When determining where to shift the dynamic notification icon in response to the altered playback of the media asset, the media guidance application may identify the current playback position (e.g., the 58-minute mark of "Fast and Furious"), the current real time (e.g., 3:02:00 pm), and the updated anticipated time of the expected event (e.g., 3:09 pm). The media guidance application may execute the trick play command (e.g., rewind). When the trick play command is complete (e.g., the user stops rewinding), the media guidance application measures the new playback position (e.g., the 54-minute mark of "Fast and Furious") and the updated current real time (e.g., 3:03:30 pm). The media guidance application may determine the time difference between the updated anticipated time of the expected event and the updated current real time. In this example, the time difference is 5 minutes 30 seconds. The media guidance application may determine the sum between the time difference and the new playback position. In this example, the sum is 59 minutes 30 seconds, which indicates that at the updated anticipated time of the expected event, the user will be watching "Fast and Furious" at the 59-minute 30-second mark. Accordingly, the media guidance application may shift the dynamic notification icon the 59-minute 30-second mark. This process may be performed in real-time and does not require the user to provide a command to stop execution of the trick play.

In some embodiments, the media guidance application may determine a time difference between a first playback position of the media asset (e.g., the 56-minute mark of "Fast and Furious") and the first position (e.g., the 62-minute mark of "Fast and Furious"). In this example, the time difference is 6 minutes. The media guidance application may generate for consumption a different media asset starting at a second playback position. For example, the user may decide that he/she wants to listen to a podcast that is 30 minutes in duration. The second playback position may be the 5-minute mark of the podcast. The media guidance application may generate, for display on a new progress indicator associated with consumption of the different media asset, the dynamic notification icon at a third position, wherein the second playback position precedes the third position by the time difference. For example, the media guidance application may generate the dynamic notification icon on the progress indicator of the podcast at a third position. The third position may be determined, by the media guidance application, as the sum of the second playback position and the time difference. Thus, in this example, the dynamic notification icon is generated on the progress indicator of the podcast at the 11-minute mark.

As discussed, the dynamic notification icon provides users with a clear visual indicator of events relative to their consumption of media. By knowing when an event is expected to occur, a user may change the way he/she consumes media. For example, the user may stop playing a video game early to save the game. A user may stop watching a live broadcast and record the remaining stream while directing his/her attention to the event. If the user is talking on a phone, the dynamic notification icon may inform the user that an event is expected to occur 5 minutes into the call. Therefore, the user should say whatever he/she wants during those 5 minutes.

In some embodiments, the media guidance application may also track all notifications received by various applications and map them to the activities and/or media the user participated in. For example, the user may receive three notifications from a social media application while playing a video game. The user may thus be able to access a table to view the notifications he/she received while playing the video game, the time the notifications were received, and data such as the anticipated time of the expected events. The media guidance application may sort and/or filter the notifications of the table based on the application from which they were received, the media the user was consuming, the time of receipt, etc. The media guidance application may generate for display the table.

In some embodiments, the media guidance application may generate the progress indicator while the user is traversing an electronic program guide (EPG). For example, for long time events (e.g., the Uber™ driver is expected to arrive in 4 hours), the media guidance application may generate a dynamic notification icon on the timeline of an EPG. In a scenario where the user is traversing an EPG when a first show is being broadcast, relative to the user's consumption of media, the media guidance application may generate for display the dynamic notification icon above a tile indicative of a second show that will be broadcast 4 hours from the first show.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 is a flowchart of an illustrative process for determining the anticipated time of the expected event, in accordance with some embodiments of the disclosure;

FIG. 8 is a flowchart of an illustrative process for determining the updated anticipated time of the expected event based on expected route information, in accordance with some embodiments of the disclosure;

DETAILED DESCRIPTION

Figure 1A:
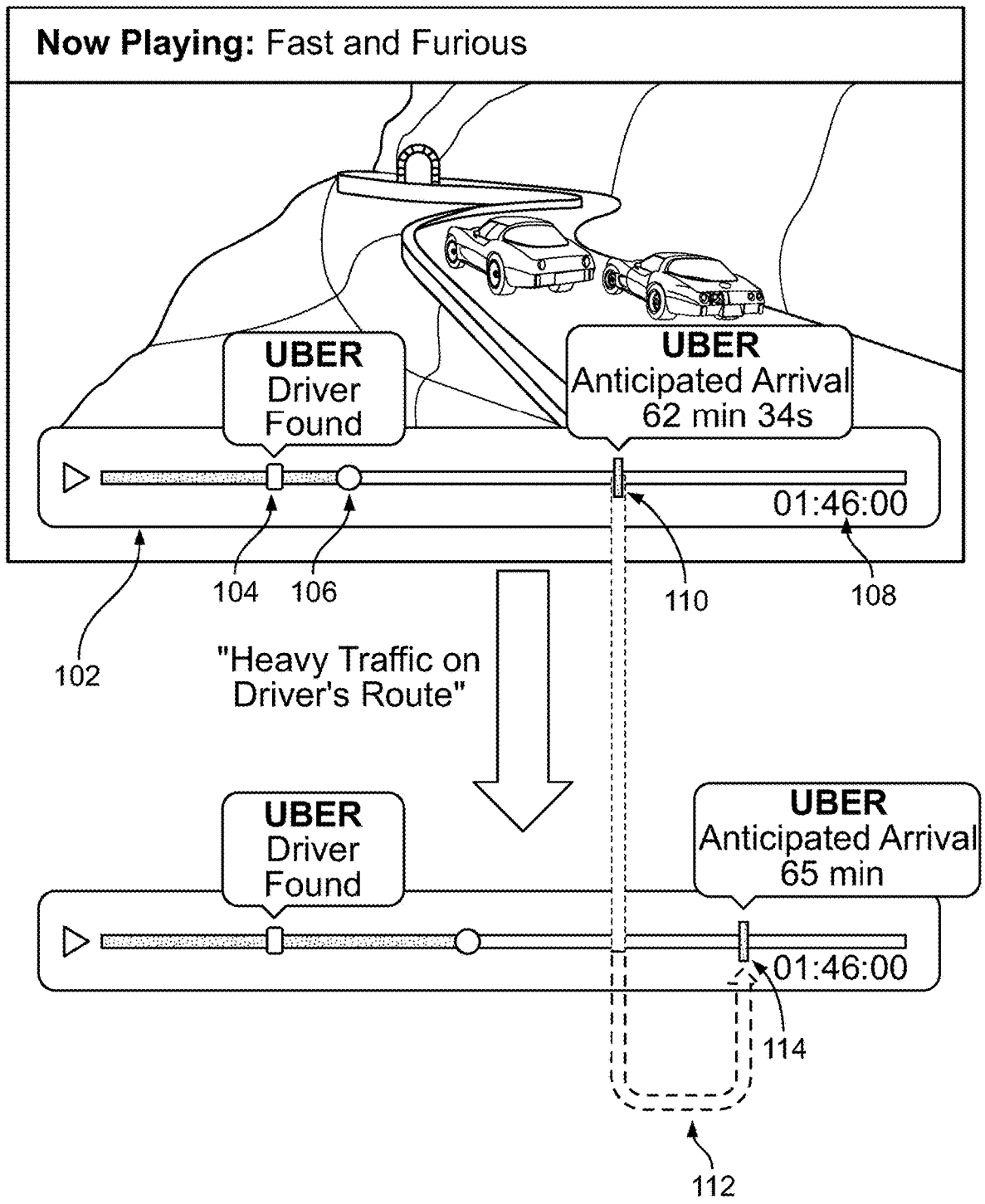
FIG. 1A shows an illustrative example of a scenario for tracking status of a dynamic event and displaying a corresponding notification icon on a media playback progress indicator, in accordance with some embodiments of the disclosure.

Systems and methods are described for tracking the status of a dynamic event and displaying a corresponding notification icon on a media progress indicator. In one exemplary embodiment, a user may be watching a movie on his smartphone. The smartphone may receive a notification generated by an application (e.g., Uber™) confirming that a requested driver is headed to the user's location. A media guidance application may parse the notification and determine that a dynamic event (e.g., the arrival of the Uber™ ride at the user's location) is expected to occur. Here, the term "dynamic" implies that the event is not set to occur at a fixed time and can be delayed or expedited based on various known and unknown variables. In this scenario, these variables may include traffic, weather, commuting regulations, any other variable that may affect the time of arrival, or any combination thereof.

The media guidance application may proceed to estimate the anticipated time of occurrence of the dynamic event and generate a visual icon representing the anticipated time of occurrence on the media progress indicator of the movie the user is watching. For example, the estimated anticipated time of occurrence may be 4:00 pm. The media guidance application may determine that at 4:00 pm, if the user continues watching the movie in normal playback mode, the user will have watched 62 minutes of the movie. Accordingly, the media guidance application will generate a visual icon at the 62-minute mark on the progress indicator. The visual icon may be shifted around on the progress indicator as the media guidance application receives more information about the status of the event. The visual icon enhances the user interface by providing the user with a visual aid for identifying when an event is set to occur in reference to the user's viewing activity. Displaying a basic notification indicating that the expected event is set to occur at 4:00 pm is not efficient because users are not expected to constantly refer to a clock to check the current time and compare it with 4:00 pm. Tying the notifications to the progress indicator provides the user with a sense of time passing as linked by the consumption of the media asset. Thus, users can identify events and alter their media consumption experience based on information directly in the media progress indicator.

FIG. 1 shows an illustrative example of a scenario 100 for tracking status of a dynamic event and displaying a corresponding notification icon on a media progress indicator, in accordance with some embodiments of the disclosure. In scenario 100, progress indicator 102 represents the consumption of the media asset (e.g., "Fast and Furious"), which is being generated for display. Icon 104 represents a visual indicator of the first notification as received at a time relative to the consumption of the media asset. Position 106 represents the current playback position of the user. Duration 108 represents the duration of the media asset being generated for display. Dynamic icon 110 represents a visual indicator (e.g., dynamic notification icon) of the expected event. In FIG. 1, a second progress indicator is also depicted which represents the progress indicator 102 at a future time. On the second progress indicator, shift 112 represents a movement of dynamic icon 110 to position 114, in response to the media guidance application receiving the information "heavy traffic on driver's route."

In some aspects, a media guidance application may receive, from an application, a first notification during consumption of a media asset. In some embodiments, the media asset may be a video, an audio clip, a slideshow of images, a video game, digital information, or any other type of media. Each media asset may be associated with a progress indicator that describes the user's duration of consumption and/or progression through the media asset. For example, if the user is watching a live broadcast on his/her set-top box, the progress indicator may be a temporal progress bar that allows the user to view the tentative duration of the event. If the user is accessing a video game, the progress indicator may be a visual monitor that informs the user of how much of the video game the user has completed (e.g., 70% of the main storyline). If the user is viewing exercise information while exercising on a fitness machine (e.g., a cardio bike), the progress indicator may inform the user of the physical distance the user has pedaled. If the user is consuming a movie, the progress indicator may be a playback progress bar.

In one example, a user may be using a video-streaming service such as Netflix™ to view the movie "Fast and Furious." During consumption of "Fast and Furious," the user may receive a notification from a taxi-delivery application such as Uber™. In an example, the user may request a taxi via Uber™. The first notification may indicate that a driver has accepted the user's request and the taxi is on its way to the user's location. In one example, there are two applications to consider. The first is the Netflix™ application on which the user is streaming "Fast and Furious," and the second is the Uber™ application from which the notification is received. To ultimately generate for display notifications from the Uber™ application on the Netflix™ application, the media guidance application monitors incoming notifications and bridges communication between the respective applications and various devices. Thus, even if the user is viewing "Fast and Furious" and requesting a taxi on different devices (e.g., a set-top box and a smartphone, respectively), the media guidance application may monitor incoming notifications on both devices, receive the notification on the smartphone, determine that the user is viewing media on the set-top box, and transmit the notification to the set-top box, accordingly.

The media guidance application may determine, based on information from the first notification, that an expected event will occur at a future time, wherein the expected event does not have a fixed time of occurrence. In the previous example, the first notification was received in response to the user's request for a taxi. The first notification indicated that a driver accepted the request and is traveling to the user. In this scenario, the user requested a taxi at his/her location, the first notification is an acknowledgment of the user's request, and the resolution to the user's request is the arrival of the taxi. Accordingly, the media guidance application may determine that the user's request is resolved in response to the arrival of the taxi and may identify the arrival as the expected event. Furthermore, the media guidance application may determine the type of request the user has made and the likelihood of the request being resolved by a fixed time. For example, the media guidance application may refer to a predetermined database that lists various types of requests (e.g., vehicular, alarm, appointment, shopping, meeting, recording, etc.) and whether they can be resolved in a fixed time. An example of a fixed time event is an alarm request. In this case, the user may request a smart speaker (e.g., a Google™ Home) to wake him/her up at 6:00 am. The first notification may be the Google™ Home audibly indicating "Ok, I will wake you up at 6:00 am." The expected event is the Google™ Home ringing the alarm exactly at 6:00 am. Thus, the predetermined database may indicate that an alarm request is associated with fixed times. In the case of a vehicular request, particularly departures and arrivals, variables such as traffic and weather may cause delays or expedited occurrences of expected events. Therefore, the predetermined database may indicate that vehicular requests are subject to time adjustments.

In some embodiments, the user may receive a text from a friend stating, "I will leave my place in 5 minutes and head your way." The media guidance application may identify the text as the first notification. In this example, this may be the first text exchanged between the user and the friend (e.g., the user did not text beforehand requesting the friend's commute status). In some embodiments, in order to determine, based on information from the first notification, that the expected event will occur at the future time, the media guidance application may first parse textual information from the first notification. The media guidance application may use natural language processing to interpret the friend's text. In some cases, the media guidance application may first convert mediums such as audio (e.g., a voicemail message, a phone call, etc.) to text. When parsing the textual information, the media guidance application may identify keywords such as verbs, nouns, and numbers. In the friend's text, the media guidance application may identify "will," "leave," "my place," "5 minutes," "head," and "your way." The media guidance application may determine, based on the parsing, that the textual information comprises at least one verb in a future tense. For example, the media guidance application may determine that "will," "leave," and "head" are verbs. The verb "will" indicates a future tense. In response to determining that the textual information comprises at least one verb in the future tense, the media guidance application may determine that the expected event will occur at the future time. By using natural language processing, the media guidance application may further determine that the expected event, based on "will leave my place in 5 minutes" is the friend leaving his location. In addition, the media guidance application may identify a second expected event based on "head your way," which involves the friend's arrival at the user's location.

In some embodiments, the media guidance application may determine, based on information from the first notification, that the expected event will occur at the future time by first determining a notification type of the first notification. The media guidance application may classify the first notification based on the application that generated the notification and the content of the notification. The classifications of the notification type may be "general notification" (e.g., user's photo received a comment on social media), "query notification" (e.g., a text asking, "when are you arriving?"), "confirmation notification" (e.g., an email stating "your shopping order is confirmed") and "resolution notification" (e.g., an alert stating, "your package has been delivered"). When classifying a notification, the media guidance application may look for keywords such as "confirmation," "received," "request," "complete," "status," etc. The media guidance application may also look for punctuation such as question marks. Alongside the classification, the notification type may indicate the application name. In the overarching example, the first notification generated by the Uber™ application indicates that a driver is headed toward the user. Because the notification is received in response to a user request, the media guidance application may determine the notification type to be "Uber™—confirmation notification." In some embodiments, the notification type may be more detailed. For example, the notification type may include a description section and thus may appear as "Uber™—confirmation notification—driver found."

The media guidance application may retrieve, from memory, a history of notifications of the determined notification type generated by the application. The history of notifications may be a data structure that lists notifications delivered to the user, the devices on which the notifications were delivered, the applications that generated the notifications, the respective notification types, etc. For example, the media guidance application may perform a search for previous notifications with the notification type "Uber™—confirmation notification—driver found." This retrieval may be specific to the user's devices (e.g., the user may have used the Uber™ application on his/her smartphone and/or through his/her smart speaker). The media guidance application may determine, based on the history of notifications, a rate at which a follow-up notification was received from the application after receiving a notification of the determined notification type. The follow-up notification is a notification tied to the first notification. For example, if the notification type is "query notification" or "confirmation notification," the follow-up notification may be a "resolution notification" indicating that an event has occurred resolving the query or confirmation of an event.

The media guidance application may utilize machine learning techniques (e.g., binary classification) to determine whether a notification that follows the first notification is a follow-up notification to the first notification of the notification type. Specifically, the media guidance application may identify notification chains generated by various applications. For example, a notification chain for an Uber™ taxi request may involve receiving confirmation of a driver accepting the user's request, receiving an alert that the driver has arrived at the user's location, and receiving confirmation that the trip has ended. Based on the notification chains, the media guidance application may determine whether a notification is a follow-up notification. This prevents notifications unrelated to the content of the first notification from being classified as a follow-up notification. Thus, a general notification (e.g., a coupon for a ride) may not be considered a follow-up notification because it is not part of the notification chain.

The rate at which follow-up notifications were received may be determined for a given time period. For example, in response to retrieving the history of notifications, the media guidance application may identify, out of 100 notifications listed as the notification type "Uber™—confirmation notification—driver found," 99 notifications indicating the arrival of the driver at the user's location (e.g., a "resolution notification"). The media guidance application may perform a search specific to a time period "within the past month." Based on the dates of notification delivery in the history of notifications, the media guidance application may identify, out of 10 notifications, 10 notifications indicating the arrival of the driver. In the first example, the rate is 99% and in the second example, the rate is 100%. The media guidance application may retrieve from memory a threshold rate, which represents the minimum rate for which the media guidance application can anticipate a follow-up notification of an expected event. In response to determining that the rate at which the follow-up notifications were received is greater than the threshold rate, the media guidance application may determine that the expected event will occur at the future time. For example, if the minimum rate is 80%, the media guidance application will anticipate the expected event given the higher rates determined from the history of notifications.

In response to determining that the expected event will occur, the media guidance application may determine an anticipated time of the expected event. For example, the media guidance application may anticipate that the expected event (e.g., the arrival of the driver) will occur. The media guidance application may proceed to therefore determine when the expected event will happen. The anticipate time of the expected event may be described by the day and time (e.g., Jun. 15, 2018 at 4:00 pm). In some embodiments, the media guidance application may determine the anticipated time of the expected event by determining a notification type of the first notification. Followed by determining the notification type (e.g., "Uber™—confirmation notification—driver found"), the media guidance application may retrieve, from memory, a history of notifications of the determined notification type generated by the application. Based on the history of notifications, the media guidance application may calculate an average time difference between a time when an initial notification (e.g., the first notification) was received and a time when a follow-up notification to the initial notification was received. For example, the media guidance application may determine that the average time difference between when a driver accepted the user's request for a taxi and when the driver arrived at the user's location is 6 minutes 34 seconds over 100 notification and follow-up notification pairs. It should be noted that the average time difference is not limited to the mean of all times between the respective notifications. For example, the media guidance application may use other statistical values such as standard deviation, mode, etc. to calculate the average time difference. The media guidance application may determine that the anticipated time of the expected event is a sum of the average time difference and a time when the first notification was received. For example, the first notification may have been received on Jun. 15, 2018 at 3:00 pm. The anticipated time of the event is therefore Jun. 15, 2018 at 3:06:34 pm.

The media guidance application may generate, for display on progress indicator 102 associated with the consumption of the media asset, dynamic icon 110 at a first position. As mentioned previously, the user may be viewing "Fast and Furious" on the Netflix™ application of the user's set-top box. Progress indicator 102 displaying playback of the media asset may thus be an overlay displaying a current position 106 and a bar representing the duration of the media asset (e.g. indicated by duration 108). Dynamic icon 110 may be any visual indicator that specifies information such as a playback position. The first position is indicative of the anticipated time of the expected event relative to the consumption of the media asset. For example, current position 106 of the user may be 56 minutes into the movie "Fast and Furious." The real time while the user is at the 56-minute mark may be 3:00 pm. Accordingly, the media guidance application may receive the first notification and determine the anticipated time of the event to be at 3:06:34 pm. The media guidance application may determine that at 3:06:34 pm, if the user continues watching the movie in normal playback mode, the user will have watched 62 minutes 34 seconds of "Fast and Furious." Accordingly, the media guidance application will generate dynamic icon 110 on the first position, which is 62 minutes 34 seconds, on progress indicator 102. In some embodiments, the media guidance application may also generate for display icon 104 on progress indicator 102 (e.g., at the 56-minute mark) in response to receiving the first notification.

Prior to the expected event, the media guidance application may receive from the application, updated information associated with the expected event. The updated information may be information directly from the application (e.g., a status update, cancellation, etc.). The updated information may also be from another resource such as the Internet, a second application, or a database. In the Uber™ example, the updated information from the Uber™ application may be a text or call from the driver, a cancellation, a new driver replacing the old one, the driver's route, the vehicle information, etc. The updated information from a secondary source may be traffic details, the news, weather information, etc.

The media guidance application may determine an updated anticipated time of the expected event based on the updated information. For example, the driver may call the user at 3:02 pm stating that he/she will arrive after dropping off a current passenger whose destination is on the route to the user's location. The media guidance application may utilize natural language processing to interpret the driver's statement, identify that the driver is occupied and may be delayed, and add a predetermined delay time of one minute to account for the taxi stopping to drop off the current passenger. Thus, the updated anticipated time of the expected event is 3:07:34 pm. The predetermined delay time may be retrieved from a database that associates variables across various applications with time adjustments.

In some embodiments, the media guidance application may determine the updated anticipated time of the expected event, based on the updated information, by first determining that the updated information comprises expected route information. For example, the Uber™ application provides GPS information of the driver's location to users. The GPS information allows users to view the route the driver is taking. The media guidance application may calculate an expected travel time to navigate a route specified by the expected route information. The media guidance application may use a secondary source, such as the Internet, to identify local traffic, weather issues, and the news to estimate the expected travel time to travel the route the driver is taking to get to the user. For example, the news may indicate that a parade is set to occur near the user's area and several streets will be closed off. Traffic conditions may be poor in the user's area, causing delay times of 5 minutes for all vehicles. Taking into account the driver's route and the updated information from the secondary source, the media guidance application may utilize a probabilistic algorithm that is a function of travel route, traffic, weather, and commuting information (e.g., retrieved from the news), to determine most likely travel time. In some cases, the media guidance application may also utilize machine learning techniques (e.g., collaborative filtering) to determine the time adjustments to apply for each variable (e.g., streets covered in snow cause for 2 minutes of additional travel time). For example, given the updated information retrieved from the Uber™ application and the Internet, the media guidance application may determine that the expected travel time is 8 minutes. The expected travel time may be updated in real-time as additional updated information is received by the media guidance application. The media guidance application may determine that the updated anticipated time of the expected event is a sum of the expected travel time and the time when the updated information was first received subsequent to the receiving the first notification. For example, if the first notification was received at 3:00 pm and the updated information indicating the driver's status was received 3:01 pm, the updated anticipated time of the expected event may be 3:09 pm (e.g., summing 3:09 pm with 8 minutes). It should be noted that the updated information may be received along with the first notification.

In some embodiments, the media guidance application may determine the updated anticipated time of the expected event, based on the updated information, by first determining that the updated information comprises a delay time value associated with an occurrence of the expected event. Not all application notifications are associated with travel. For example, the user may be waiting for a doctor's appointment or for the installation of a software program. In these situations, the media guidance application may anticipate a resolution notification indicating that the doctor can see the user or that the software program has been installed. Delays for these respective scenarios may involve the doctor taking too long with the current patient and the processing power for installing the software program being reallocated to start another program. In the case of the doctor, certain hospitals provide applications to users to set appointments and directly message their doctors. Accordingly, the user may receive, via the hospital's application, a message from the user's doctor indicating that he needs an additional 5 minutes before he can attend to the user. The delay time value thus becomes 5 minutes. The original anticipated time of the expected event (e.g., the appointment) may be 4:00 pm. In view of the doctor's message, the media guidance application may determine that the updated anticipated time of the expected event is a sum of the anticipated time of the expected event (4:00 pm) and the delay time value (5 minutes). In this example, the updated anticipated time of the expected event is 4:05 pm.

It should be noted that the techniques described above for determining the updated anticipated time of the expected event may also be used to determine the anticipated time of the expected event. Likewise, the techniques described for determining the anticipated time of the expected event may be used to determine the updated anticipated time of the expected event. In some embodiments, the user may provide input to the media guidance application indicating the actual time of the expected event (e.g., when the driver actually ended up arriving at the user's location). In response, the media guidance application may use the input as training data to improve its machine learning and probabilistic modelling. For example, given the actual time of the expected event, the media guidance application may apply appropriate weights and implement time adjustments to improve delay time estimates with respect to news, traffic, weather, route, etc. This may ultimately improve the initial calculation of the anticipated time of the expected event and, as will be discussed, may minimize the shifting of dynamic icon 110.

The media guidance application may compare the anticipated time of the expected event and the updated anticipated time of the expected event. Considering the taxi request example, the media guidance application determined the anticipated time of the expected event to be 3:06:34 pm and the updated anticipated time of the event to be 3:09 pm. In response to determining that the anticipated time of the expected event and the updated anticipated time of the expected event do not match, the media guidance application may shift dynamic icon 110 to position 114 on progress indicator 102 (e.g., depicted by shift 112), wherein position 114 is indicative of the updated anticipated time of the expected event relative to the consumption of the media asset. Because 3:06:34 pm and 3:09 pm are different times, the media guidance application may determine position 114 on progress indicator 102. For example, the current time may be 3:01 pm and current position 106 may be 57 minutes. The media guidance application may determine the difference between 3:09 pm and 3:01 pm to be 8 minutes and add 8 minutes to current position 106. Accordingly, the media guidance application may determine position 114 to be 65 minutes, the sum of the respective time values. The media guidance application may thus move dynamic icon 110 from the 62-minute 34-second mark to the 65-minute mark on progress indicator 102 of "Fast and Furious."

In some embodiments, the media guidance application may receive updated information in real-time (e.g., the driver's route). As a result, the media guidance application may generate a data structure (e.g., an array, linked list, stack, etc.) to store the updated anticipated times of the expected event. For example, the media guidance application may determine, at a first time, that the updated information indicates a delay of 5 minutes. At a second time, later than the first time and before the time of the expected event, the media guidance application may receive more updated information indicating a reduction in the delay to 2 minutes. In this embodiment, dynamic icon 110 is shifted in real-time and the latest updated anticipated time of the expected event is compared with the previously calculated updated anticipated time rather than the anticipated time (e.g., the first calculation of the anticipated time). In order to save processing, the media guidance application may retrieve updated information after a period of time (e.g., every 2 minutes) and recalculated the updated anticipated time of the expected event.

In some embodiments, the media guidance application may determine a start playback time and an end playback time for an important scene of the media asset. For example, the media guidance application may retrieve metadata associated with the movie "Fast and Furious." The media guidance application may identify a scene in the movie that contains an attribute (e.g., the appearance of an actor) that matches the user's preference (e.g., the user likes to watch the actor based on his/her viewing history). In response to determining that the scene includes an actor the user likes, the media guidance application may determine that the scene is an important scene. Important scenes may also be popular scenes that several people have watched. For example, the important scene may be a race scene at the climax of the movie. Based on the metadata of the movie, the media guidance application may determine that the start playback time is 60 minutes and the end playback time is 68 minutes into the movie. The media guidance application may determine that position 114 of dynamic icon 110 is at the start playback time or between the start playback time and the end playback time. As previously determined, position 114 is 65 minutes or equivalent (e.g., in percentage or fraction) on progress indicator 102. Therefore, the media guidance application may determine that position 114 within the start and end playback times of the important scene. In order to prevent the expected event from interrupting the scene, the media guidance application may determine a time difference between position 114 and the end playback time. For example, the time difference between position 114 (e.g., 65 minutes) and the end playback time (e.g., 68 minutes) is 3 minutes. The media guidance application may send a request to the application to delay the expected event by the time difference. For example, the media guidance application may inform the Uber™ application to inform (e.g., via an in-app alert, a text, and/or a call) the driver to wait an additional 3 minutes for the user. This would allow the user to finish viewing the important scene in the media asset. In some embodiments, in response to receiving, from the application, an acknowledgment of the request to delay the expected event by the time difference, the media guidance application may shift dynamic icon 110 on progress indicator 102 from position 114 to the end playback time. For example, the Uber™ application may generate a message indicating that the driver has been informed of the user's instructions and will wait an extra 3 minutes. As a result, the media guidance application may shift the dynamic position icon to the end playback time (e.g., 68 minutes). In the event that the driver cannot provide acknowledgement, the user may be alerted to pause the important scene. In some embodiments, in place of an acknowledgment, the media guidance application may receive a time delay value from the application. For example, the driver may message user saying that he/she can only wait for one minute. In response, the user may be alerted of the important scene and the media guidance application may shift dynamic icon 110 to a third position that is one minute after position 114 (e.g., to account for the driver's conditions).

In some embodiments, the media guidance application may receive a trick play command to pause consumption of the media asset. For example, the user may pause "Fast and Furious" on his/her set-top box. In response to pausing consumption, the media guidance application may calculate a pause time value based on an amount of time the media asset was paused. For example, the media guidance application may initiate a timer once the media asset is paused. In this example, at 3:02 pm, the user may leave the media asset paused for 5 minutes at the 58-minute mark of the movie "Fast and Furious." The media guidance application may receive a second trick play command to resume consumption at 3:07 pm. If the updated anticipated time of the expected event is at 3:09 pm, the media guidance application may determine that relative to the consumption of the media asset, the expected event will occur at the 60-minute mark (e.g., 2 minutes from the pause position), rather than the 65-minute mark. The media guidance application may thus shift dynamic icon 110 on progress indicator 102 to a third position, wherein the third position (e.g., the 60-minute mark) precedes position 114 (e.g., the 65-minute mark) by the pause time value (e.g., 5 minutes). In some embodiments, rather than waiting for the user to provide the command to resume consumption, the media guidance application may update the position of dynamic icon 110 in real-time. Thus, as the timer measures the pause duration, dynamic icon 110 shifts closer to current position 106.

In some embodiments, the trick play command may be fast forward, rewind, alter playback speed, etc. When determining where to shift dynamic icon 110 in response to the altered consumption of the media asset, the media guidance application may identify current position 106 (e.g., the 58-minute mark of "Fast and Furious"), the current real time (e.g., 3:02:00 pm), and the updated anticipated time of the expected event (e.g., 3:09 pm). The media guidance application may execute the trick play command (e.g., rewind). When the trick play command is complete (e.g., the user stops rewinding), the media guidance application measures the new playback position (e.g., the 54-minute mark of "Fast and Furious") and the updated current real time (e.g., 3:03:30 pm). The media guidance application may determine the time difference between the updated anticipated time of the expected event and the updated current real time. In this example, the time difference is 5 minutes 30 seconds. The media guidance application may determine the sum between the time difference and the new playback position. In this example, the sum is 59 minutes 30 seconds, which indicates that at the updated anticipated time of the expected event, the user will be watching "Fast and Furious" at the 59-minute 30-second mark. Accordingly, the media guidance application may shift dynamic icon 110 the 59-minute 30-second mark. This process may be performed in real-time and does not require the user to provide a command to stop execution of the trick play. In another example, the trick play command may be to pause a video game the user is accessing. In another example, if the user is exercising on a bike, a trick play command may be considered a change in the user's exercise (e.g., the user enters a more rigorous mode of training) or the user taking a break.

In some embodiments, the media guidance application may determine a time difference between a first playback position of the media asset (e.g., the 56-minute mark of "Fast and Furious") and the first position (e.g., the 62-minute mark of "Fast and Furious"). In this example, the time difference is 6 minutes. The media guidance application may generate for consumption a different media asset starting at a second playback position. For example, the user may decide that he/she wants to listen to a podcast that is 30 minutes in duration. The second playback position may be the 5-minute mark of the podcast. The media guidance application may generate, for display on a new progress indicator associated with consumption of the different media asset, dynamic icon 110 at a third position, wherein the second playback position precedes the third position by the time difference. For example, the media guidance application may generate dynamic icon 110 on progress indicator 102 of the podcast at a third position. The third position may be determined, by the media guidance application, as the sum of the second playback position and the time difference. Thus, in this example, dynamic icon 110 is generated on progress indicator 102 of the podcast at the 11-minute mark.

As discussed, the dynamic notification icon provides users with a clear visual indicator of events relative to their consumption of media. By knowing when an event is expected to occur, a user may change the way he/she consumes media. For example, the user may stop playing a video game early to save the game. A user may stop watching a live broadcast and record the remaining stream while directing his/her attention to the event. If the user is talking on a phone, the dynamic notification icon may inform the user that an event is expected to occur 5 minutes into the call. Therefore, the user should say whatever he/she wants during those 5 minutes.

In some embodiments, the media guidance application may also track all notifications received by various applications and map them to the activities and/or media the user participated in. For example, the user may receive three notifications from a social media application while playing a video game. The user may thus be able to access a table to view the notifications he/she received while playing the video game, the time the notifications were received, and data such as the anticipated time of the expected events. The media guidance application may sort and/or filter the notifications of the table based on the application from which they were received, the media the user was consuming, the time of receipt, etc. The media guidance application may generate for display the table.

In some embodiments, the media guidance application may generate the progress indicator while the user is traversing an electronic program guide (EPG). For example, for long time events (e.g., the Uber™ driver is expected to arrive in 4 hours), the media guidance application may generate a dynamic notification icon on the timeline of an EPG. In a scenario where the user is traversing an EPG when a first show is being broadcast, relative to the user's consumption of media, the media guidance application may generate for display the dynamic notification icon above a tile indicative of a second show that will be broadcast 4 hours from the first show.

Figure 1B:
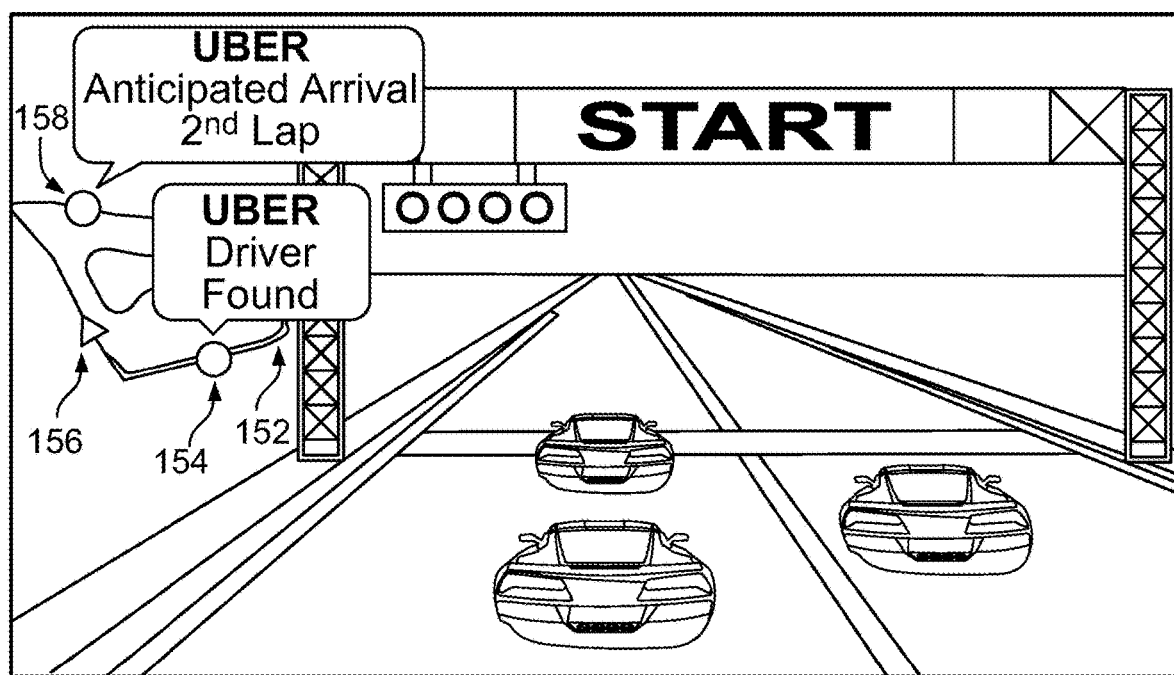
FIG. 1B shows an illustrative example of a scenario for tracking status of a dynamic event and displaying a corresponding notification icon on a video game progress indicator, in accordance with some embodiments of the disclosure.

FIG. 1B shows an illustrative example of scenario 150 for tracking status of a dynamic event and displaying a corresponding notification icon on a video game progress indicator, in accordance with some embodiments of the disclosure. It should be noted that the methods and embodiments described for FIG. 1A are applicable to FIG. 1B and can be adapted to the video game environment. In scenario 150, the user is playing a video game "Need for Speed Video Game." As depicted, the user may be racing and the user's position may be tracked on a mini-map. Progress indicator 152 represents the consumption of the media asset (e.g., "Need for Speed Video Game"), which is being generated for display. More specifically, progress indicator 152 is the in-game mini-map for the race the user is participating in. Icon 154 represents a visual indicator of the first notification as received at a position/time relative to the consumption of the media asset (e.g., relative to the user's video game car's position during the race). For example, at 12:55 pm the media guidance application may receive the first notification indicating that an Uber™ driver has been found. The media guidance application may determine that at 1:00 pm, the user's in-game car was at position 154 and generate for display Icon 154 at position 154.

Position 156 represents the current position of the user's car in the race. Dynamic icon 158 represents a visual indicator (e.g. a dynamic notification icon) of the expected event (e.g., the arrival of the Uber™ ride requested by the user). In some embodiments, the media guidance application may determine a progression speed of the user. The progression speed represents how quickly the user consumes media and can be quantitative value (e.g., a ratio, time, percentage, etc.) or a qualitative value (e.g., "fast," "average," "slow," etc.). In order to determine the progression speed, the media guidance application may monitor the user profile of the user to determine a completion time of a media asset previously accessed. For example, the media guidance application may determine that the user accessed a movie that had a runtime of 1 hour. The media guidance application may determine that the completion time for consuming the movie was 1 hour. The media guidance application may determine the ratio between the runtime and the completion time. In this example, the ratio is 1, which indicates that the user may have watched the movie at a normal playback mode. The progression speed allows the media guidance application to estimate where to place the dynamic notification icon.

Applying the previously mentioned embodiment to FIG. 1B, the media guidance application may determine the amount of time the user takes to complete a portion of the video game (e.g., time to complete a lap in the race). For example, in previous races on the same portion (e.g., lap of the race map), the user may have taken 13 minutes to complete the portion. In some cases, the video game itself may provide an estimate of when the user will complete a portion (e.g., a level, mission, race, etc.). The media guidance application may determine that the anticipated time of the expected event is 1:02 pm and the current time, while the user's car is at position 156, is 12:58 pm. The amount of time the user takes to complete a portion or a remaining portion (e.g., remainder of the lap of the race map) may be interpreted by the media guidance application as the progression speed (e.g., 4 minutes remaining to complete the lap). In response to determining that the anticipated time of the expected event is 4 minutes away from the current time and that the user's car is expected to be at position 158 based on the progression speed, the media guidance application may generate for display dynamic icon 158 at position 158.

Applying the embodiments previously described to an exercise machine, the media guidance application may determine the progression speed of the user based on a rate at which the user is exercising. For example, the media guidance application may determine that the user pedals 100 times in a minute based on the user's historic progress (e.g., the user has pedaled 800 times in the previous 8 minutes or the user pedals about 100 times on average per minute). If the expected event is anticipated to occur 5 minutes from the current time, the media guidance application may determine that the user will pedal 500 more times until the expected event. In this example, the anticipated time of the expected event may be in units of pedals. The second position may therefore be a sum of the user's current position (e.g., 800 pedals according to the exercise machine) and the anticipated time of expected event (e.g., in 500 pedals) for a total of 1300 pedals. This notifies the user that when he/she reaches 1300 pedals, he/she is expected to get a notification indicating the arrival of the Uber™ ride. The second position may be generated for display on the user interface of the exercise machine (e.g., as the number 1300 besides the user's current pedal count).

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 2:
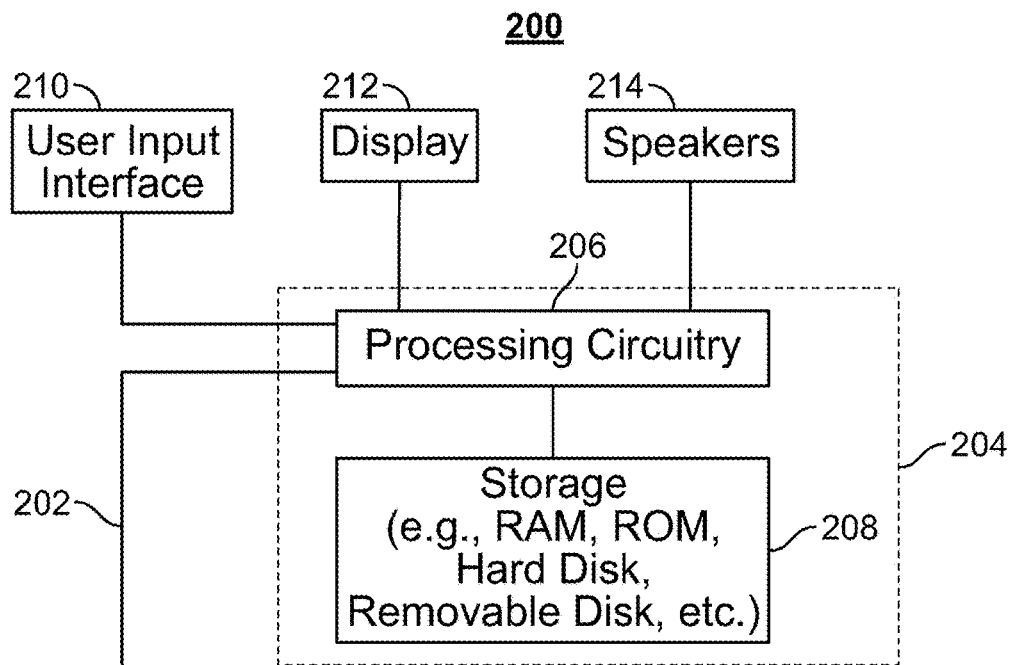
FIG. 2 is a block diagram of an illustrative user equipment device in accordance with some embodiments of the disclosure.

Users may access content and the media guidance application (and its display screens described above and below) from one or more of their user equipment devices. FIG. 2 shows a generalized embodiment of illustrative user equipment device 200. More specific implementations of user equipment devices are discussed below in connection with FIG. 3. User equipment device 200 may receive content and data via input/output (hereinafter "I/O") path 202. I/O path 202 may provide content (e.g., broadcast programming, on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below). I/O functions may be provided by one or more of these communications paths, but are shown as a single path in FIG. 2 to avoid overcomplicating the drawing.

Control circuitry 204 may be based on any suitable processing circuitry such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 204 executes instructions for a media guidance application stored in memory (i.e., storage 208). Specifically, control circuitry 204 may be instructed by the media guidance application to perform the functions discussed above and below. For example, the media guidance application may provide instructions to control circuitry 204 to generate the media guidance displays. In some implementations, any action performed by control circuitry 204 may be based on instructions received from the media guidance application.

In client-server based embodiments, control circuitry 204 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 3). In addition, communications circuitry may include circuitry that enables peer-to-peer communication of user equipment devices, or communication of user equipment devices in locations remote from each other (described in more detail below).

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content described herein as well as media guidance data described above. Nonvolatile memory may also be used (e.g., to launch a boot-up routine and other instructions). Cloud-based storage, described in relation to FIG. 3, may be used to supplement storage 208 or instead of storage 208.

Control circuitry 204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 204 may also include scaler circuitry for upconverting and downconverting content into the preferred output format of the user equipment 200. Circuitry 204 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 208 is provided as a separate device from user equipment 200, the tuning and encoding circuitry (including multiple tuners) may be associated with storage 208.

A user may send instructions to control circuitry 204 using user input interface 210. User input interface 210 may be any suitable user interface, such as a remote control, mouse, trackball, keypad, keyboard, touch screen, touchpad, stylus input, joystick, voice recognition interface, or other user input interfaces. Display 212 may be provided as a stand-alone device or integrated with other elements of user equipment device 200. For example, display 212 may be a touchscreen or touch-sensitive display. In such circumstances, user input interface 210 may be integrated with or combined with display 212. Display 212 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 212 may be HDTV-capable. In some embodiments, display 212 may be a 3D display, and the interactive media guidance application and any suitable content may be displayed in 3D. A video card or graphics card may generate the output to the display 212. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 204. The video card may be integrated with the control circuitry 204. Speakers 214 may be provided as integrated with other elements of user equipment device 200 or may be stand-alone units. The audio component of videos and other content displayed on display 212 may be played through speakers 214. In some embodiments, the audio may be distributed to a receiver (not shown), which processes and outputs the audio via speakers 214.

The guidance application may be implemented using any suitable architecture. For example, it may be a stand-alone application wholly-implemented on user equipment device 200. In such an approach, instructions of the application are stored locally (e.g., in storage 208), and data for use by the application is downloaded on a periodic basis (e.g., from an out-of-band feed, from an Internet resource, or using another suitable approach). Control circuitry 204 may retrieve instructions of the application from storage 208 and process the instructions to generate any of the displays discussed herein. Based on the processed instructions, control circuitry 204 may determine what action to perform when input is received from input interface 210. For example, movement of a cursor on a display up/down may be indicated by the processed instructions when input interface 210 indicates that an up/down button was selected.

In some embodiments, the media guidance application is a client-server based application. Data for use by a thick or thin client implemented on user equipment device 200 is retrieved on-demand by issuing requests to a server remote to the user equipment device 200. In one example of a client-server based guidance application, control circuitry 204 runs a web browser that interprets web pages provided by a remote server. For example, the remote server may store the instructions for the application in a storage device. The remote server may process the stored instructions using circuitry (e.g., control circuitry 204) and generate the displays discussed above and below. The client device may receive the displays generated by the remote server and may display the content of the displays locally on equipment device 200. This way, the processing of the instructions is performed remotely by the server while the resulting displays are provided locally on equipment device 200. Equipment device 200 may receive inputs from the user via input interface 210 and transmit those inputs to the remote server for processing and generating the corresponding displays. For example, equipment device 200 may transmit a communication to the remote server indicating that an up/down button was selected via input interface 210. The remote server may process instructions in accordance with that input and generate a display of the application corresponding to the input (e.g., a display that moves a cursor up/down). The generated display is then transmitted to equipment device 200 for presentation to the user.

In some embodiments, the media guidance application is downloaded and interpreted or otherwise run by an interpreter or virtual machine (run by control circuitry 204). In some embodiments, the guidance application may be encoded in the ETV Binary Interchange Format (EBIF), received by control circuitry 204 as part of a suitable feed, and interpreted by a user agent running on control circuitry 204. For example, the guidance application may be an EBIF application. In some embodiments, the guidance application may be defined by a series of JAVA-based files that are received and run by a local virtual machine or other suitable middleware executed by control circuitry 204. In some of such embodiments (e.g., those employing MPEG-2 or other digital media encoding schemes), the guidance application may be, for example, encoded and transmitted in an MPEG-2 object carousel with the MPEG audio and video packets of a program.

Figure 3:
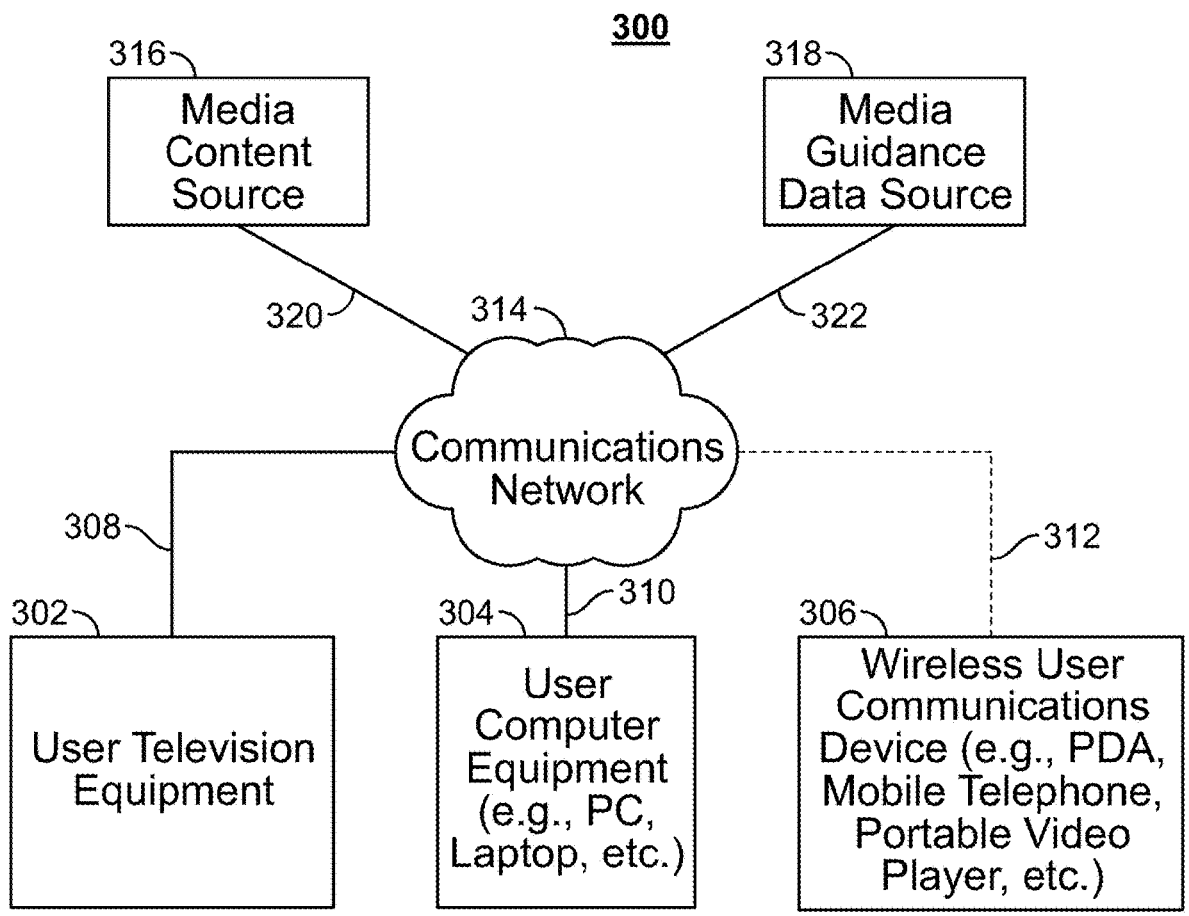
FIG. 3 is a block diagram of an illustrative media system in accordance with some embodiments of the disclosure.

User equipment device 200 of FIG. 2 can be implemented in system 300 of FIG. 3 as user television equipment 302, user computer equipment 304, wireless user communications device 306, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 2 may not be classified solely as user television equipment 302, user computer equipment 304, or a wireless user communications device 306. For example, user television equipment 302 may, like some user computer equipment 304, be Internet-enabled allowing for access to Internet content, while user computer equipment 304 may, like some television equipment 302, include a tuner allowing for access to television programming. The media guidance application may have the same layout on various different types of user equipment or may be tailored to the display capabilities of the user equipment. For example, on user computer equipment 304, the guidance application may be provided as a web site accessed by a web browser. In another example, the guidance application may be scaled down for wireless user communications devices 306.

In system 300, there is typically more than one of each type of user equipment device but only one of each is shown in FIG. 3 to avoid overcomplicating the drawing. In addition, each user may utilize more than one type of user equipment device and also more than one of each type of user equipment device.

In some embodiments, a user equipment device (e.g., user television equipment 302, user computer equipment 304, wireless user communications device 306) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, mobile voice or data network (e.g., a 4G or LTE network), cable network, public switched telephone network, or other types of communications network or combinations of communications networks. Paths 308, 310, and 312 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 312 is drawn with dotted lines to indicate that in the exemplary embodiment shown in FIG. 3 it is a wireless path and paths 308 and 310 are drawn as solid lines to indicate they are wired paths (although these paths may be wireless paths, if desired). Communications with the user equipment devices may be provided by one or more of these communications paths, but are shown as a single path in FIG. 3 to avoid overcomplicating the drawing.

Although communications paths are not drawn between user equipment devices, these devices may communicate directly with each other via communication paths, such as those described above in connection with paths 308, 310, and 312, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 314.

System 300 includes content source 316 and media guidance data source 318 coupled to communications network 314 via communication paths 320 and 322, respectively. Paths 320 and 322 may include any of the communication paths described above in connection with paths 308, 310, and 312. Communications with the content source 316 and media guidance data source 318 may be exchanged over one or more communications paths, but are shown as a single path in FIG. 3 to avoid overcomplicating the drawing. In addition, there may be more than one of each of content source 316 and media guidance data source 318, but only one of each is shown in FIG. 3 to avoid overcomplicating the drawing. (The different types of each of these sources are discussed below.) If desired, content source 316 and media guidance data source 318 may be integrated as one source device. Although communications between sources 316 and 318 with user equipment devices 302, 304, and 306 are shown as through communications network 314, in some embodiments, sources 316 and 318 may communicate directly with user equipment devices 302, 304, and 306 via communication paths (not shown) such as those described above in connection with paths 308, 310, and 312.

Content source 316 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 316 may be the originator of content (e.g., a television broadcaster, a Webcast provider, etc.) or may not be the originator of content (e.g., an on-demand content provider, an Internet provider of content of broadcast programs for downloading, etc.). Content source 316 may include cable sources, satellite providers, on-demand providers, Internet providers, over-the-top content providers, or other providers of content. Content source 316 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 318 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 318 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 318 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 318 may provide user equipment devices 302, 304, and 306 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 208, and executed by control circuitry 204 of a user equipment device 200. In some embodiments, media guidance applications may be client-server applications where only a client application resides on the user equipment device, and server application resides on a remote server. For example, media guidance applications may be implemented partially as a client application on control circuitry 204 of user equipment device 200 and partially on a remote server as a server application (e.g., media guidance data source 318) running on control circuitry of the remote server. When executed by control circuitry of the remote server (such as media guidance data source 318), the media guidance application may instruct the control circuitry to generate the guidance application displays and transmit the generated displays to the user equipment devices. The server application may instruct the control circuitry of the media guidance data source 318 to transmit data for storage on the user equipment. The client application may instruct control circuitry of the receiving user equipment to generate the guidance application displays.

Content and/or media guidance data delivered to user equipment devices 302, 304, and 306 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 300 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 3.

In one approach, user equipment devices may communicate with each other within a home network. User equipment devices can communicate with each other directly via short-range point-to-point communication schemes described above, via indirect paths through a hub or other similar device provided on a home network, or via communications network 314. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 316 to access content. Specifically, within a home, users of user television equipment 302 and user computer equipment 304 may access the media guidance application to navigate among and locate desirable content. Users may also access the media guidance application outside of the home using wireless user communications devices 306 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 314. These cloud resources may include one or more content sources 316 and one or more media guidance data sources 318. In addition or in the alternative, the remote computing sites may include other user equipment devices, such as user television equipment 302, user computer equipment 304, and wireless user communications device 306. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 304 or wireless user communications device 306 having content capture feature. Alternatively, the user can first transfer the content to a user equipment device, such as user computer equipment 304. The user equipment device storing the content uploads the content to the cloud using a data transmission service on communications network 314. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 2.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 4:
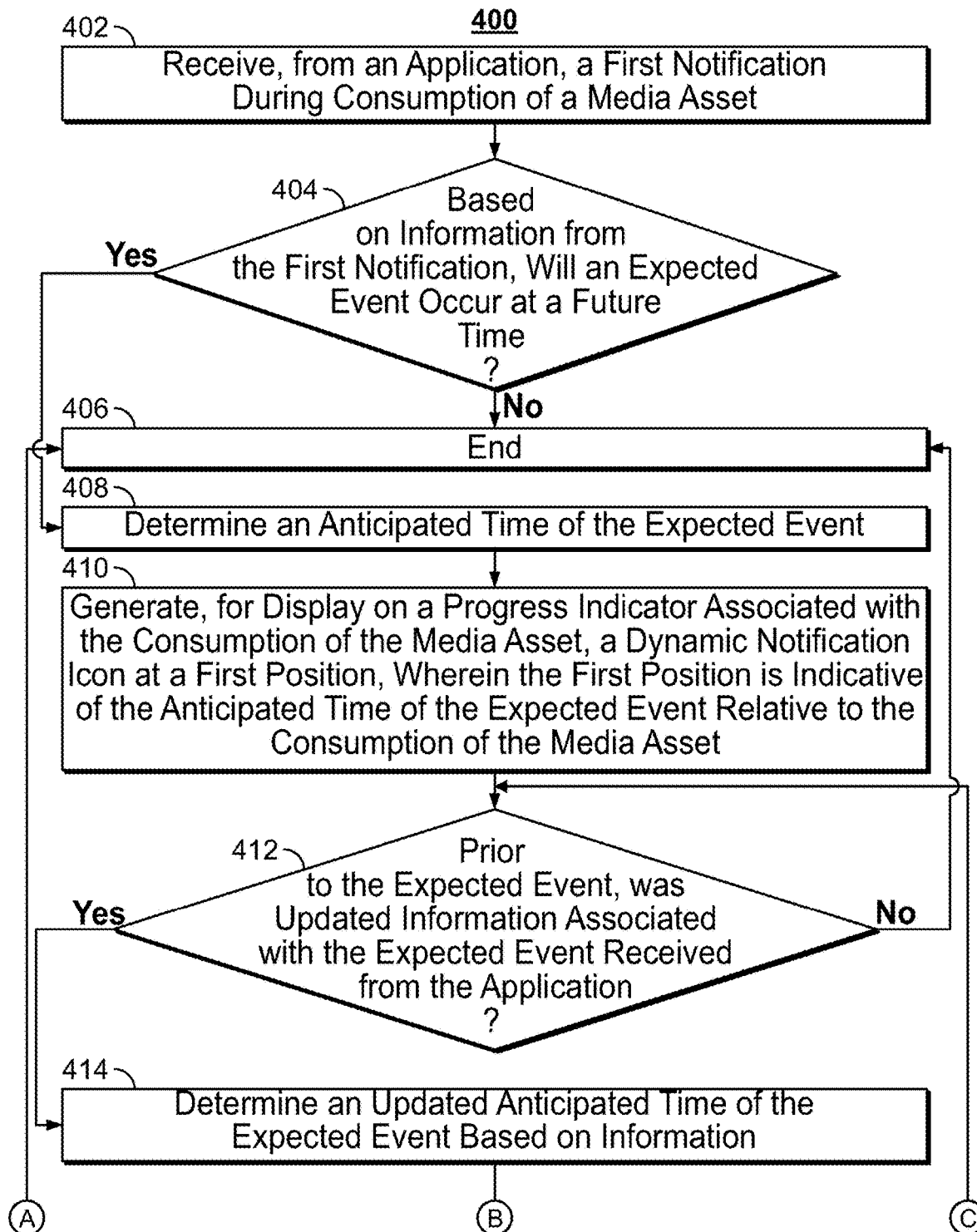
FIG. 4 is a flowchart of a detailed illustrative process for tracking status of a dynamic event and displaying a corresponding notification icon on a media progress indicator, in accordance with some embodiments of the disclosure.
Figure 4:
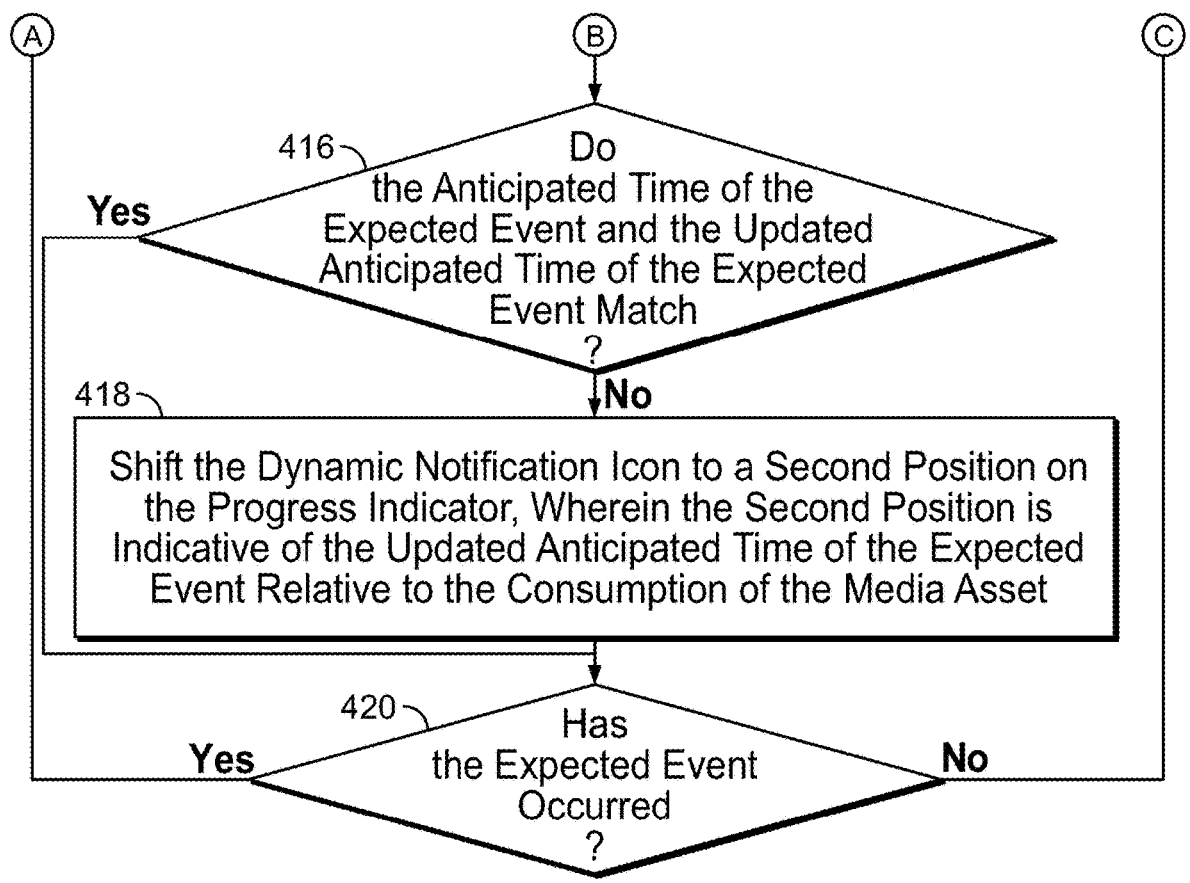

FIG. 4 is a flowchart of a detailed illustrative process for tracking status of a dynamic event and displaying a corresponding notification icon on a media progress indicator, in accordance with some embodiments of the disclosure. It should be noted that process 400 or any step thereof could be performed on, or provided by, any of the devices shown in FIGS. 2-3. For example, process 400 may be executed by control circuitry 204 (FIG. 2) as instructed by a media guidance application implemented on user equipment (which may have the functionality of any or all of user equipment 302, 304, and/or 306 (FIG. 3)). In addition, one or more steps of process 400 may be incorporated into or combined with one or more steps of any other process or embodiment (e.g., as described in relation to FIGS. 5-12). Many elements of process 400 have been described above with respect to FIG. 1, and those descriptions have full force and effect with respect to the below description of process 400, and thus details on previously-described elements are omitted for the sake of brevity.

At 402, control circuitry 204 receives, from an application, a first notification during consumption of a media asset. The user may be accessing the media asset on either user television equipment 302, user computer equipment 304, and/or wireless user communications device 306. The media asset may be a local video stored in storage 208 of the user equipment, or a stream/broadcast originating from media content source 316. The first notification may be received from a remote server connected to communications network 314. In FIG. 1, display icon 104 represents the first notification.

At 404, control circuitry 204 determines, based on information from the first notification, whether an expected event will occur at a future time. Some embodiments of this process are described in FIGS. 5 and 6. If control circuitry 204 determines the expected event will occur at a future time, at 408, control circuitry 204 determines an anticipated time of the expected event. An embodiment of this process is further described in FIG. 7. If not, at 406, process 400 ends.

At 410, control circuitry 204 generates, for display (e.g., on display 212) on a progress indicator associated with the consumption of the media asset (e.g., user input interface 210), a dynamic notification icon at a first position, wherein the first position is indicative of the anticipated time of the expected event relative to the consumption of the media asset. In FIG. 1, the dynamic notification icon is depicted as dynamic icon 110.

At 412, control circuitry 204 determines prior to the expected event, whether updated information associated with the expected event was received from the application. The updated information may be received from a remote server associated with the application (e.g., connected over communications network 314), or a secondary source (e.g., media guidance data source 318).

If control circuitry 204 determines that updated information was received from the application, at 414, control circuitry 204 determines an updated anticipated time of the expected event based on the updated information. If not, process 400 ends at 406. In FIG. 1, the updated information is depicted as the large arrow labelled "Heavy Traffic on Driver's Route." For example, control circuitry 204 may receive updated information comprising the driver's route to the user's location and traffic information (e.g., GPS information). Some embodiments of this process are described in FIGS. 8 and 9.

At 416, control circuitry 204 determines whether the anticipated time of the expected event and the updated anticipated time of the expected event match. If control circuitry 204 determines that the respective times do not match, at 418, control circuitry 204 shifts (e.g., on user input interface 210) the dynamic notification icon to a second position on the progress indicator. In some embodiments, the second position is indicative of the updated anticipated time of the expected event relative to the consumption of the media asset.

If control circuitry 204 determines that the respective times match, at 420, control circuitry 204 determines whether the expected event has occurred. Control circuitry 204 may determine that the expected event has occurred based on receiving (e.g., from a remote server connected to communications network 314) a notification indicating that the expected event has occurred. The user may also provide a manual input via I/O Path 202, indicating that the expected event has occurred.

If control circuitry 204 determines that the expected event has not occurred, the process returns to 412 and proceeds to loop by updating the anticipated time of the expected event based on updated information received at each loop. If control circuitry 204 determines that the event has occurred, the process ends at 406.

Figure 5:
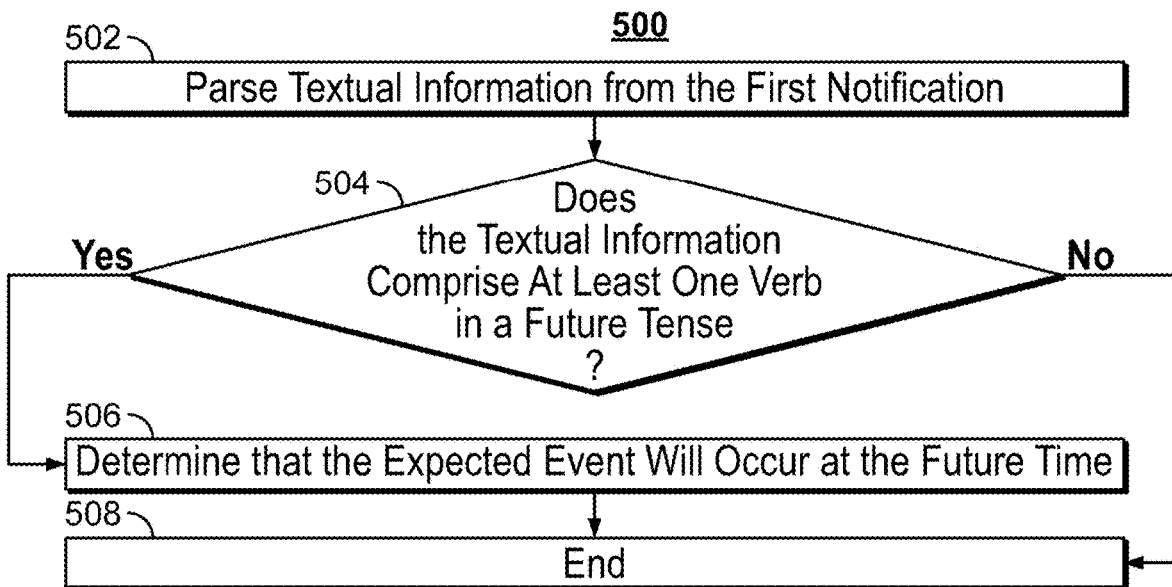
FIG. 5 is a flowchart of an illustrative process for determining that the expected event will occur based on textual information of the first notification, in accordance with some embodiments of the disclosure.

FIG. 5 is a flowchart of an illustrative process for determining that the expected event will occur based on textual information of the first notification, in accordance with some embodiments of the disclosure. It should be noted that process 500 or any step thereof could be performed on, or provided by, any of the devices shown in FIGS. 2-3. For example, process 500 may be executed by control circuitry 204 (FIG. 2) as instructed by a media guidance application implemented on user equipment (which may have the functionality of any or all of user equipment 302, 304, and/or 306 (FIG. 3)). In addition, one or more steps of process 500 may be incorporated into or combined with one or more steps of any other process or embodiment (e.g., as described in relation to FIGS. 4 and 6-12). Many elements of process 500 have been described above with respect to FIG. 1, and those descriptions have full force and effect with respect to the below description of process 500, and thus details on previously-described elements are omitted for the sake of brevity.

At 502, control circuitry 204 parses textual information from the first notification. For example, control circuitry 204 may extract "I will arrive in 5 minutes" from a notification of a text sent by the user's friend.

At 504, control circuitry 204 determines whether the textual information comprises at least one verb in a future tense. In addition to natural language processing, control circuitry 204 may rely on word databases stored in either remote servers accessible over communications network 314 or in storage 208 of the user equipment, to determine if a verb (e.g., will) is in a future tense.

If control circuitry 204 determines that the textual information comprises at least one verb in the future tense, at 506, control circuitry 204 determines that the expected event will occur at the future time. If not, the process ends at 508. For example, in response to determining that "will" implies the future tense, control circuitry 204 will determine that an expected event (e.g., the arrival of the friend) will happen in the future.

Figure 6:
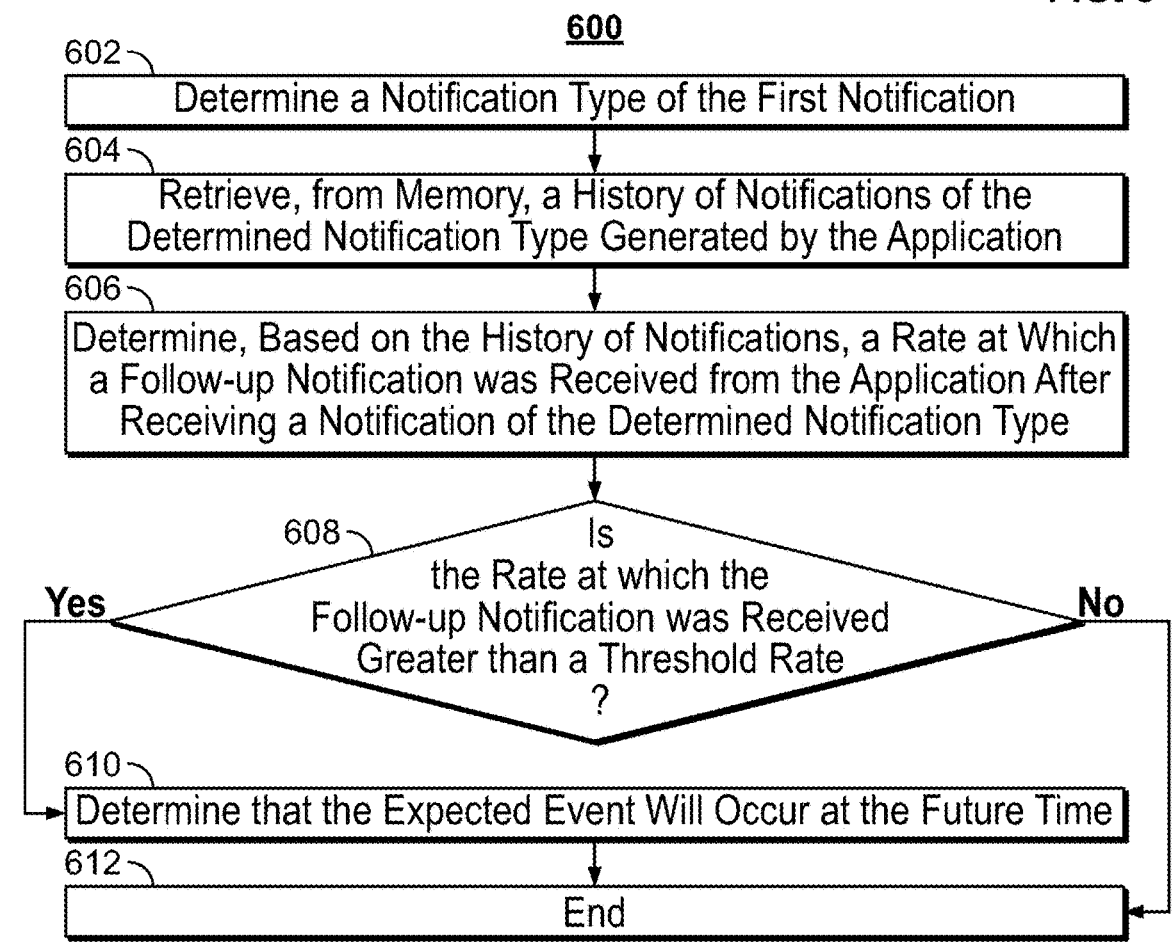
FIG. 6 is a flowchart of an illustrative process for determining that the expected event will occur based on rates of follow-up notifications to initial notifications, in accordance with some embodiments of the disclosure.

FIG. 6 is a flowchart of an illustrative process for determining that the expected event will occur based on rates of follow-up notifications to initial notifications, in accordance with some embodiments of the disclosure. It should be noted that process 600 or any step thereof could be performed on, or provided by, any of the devices shown in FIGS. 2-3. For example, process 600 may be executed by control circuitry 204 (FIG. 2) as instructed by a media guidance application implemented on user equipment (which may have the functionality of any or all of user equipment 302, 304, and/or 306 (FIG. 3)). In addition, one or more steps of process 600 may be incorporated into or combined with one or more steps of any other process or embodiment (e.g., as described in relation to FIGS. 4-5 and 7-12). Many elements of process 600 have been described above with respect to FIG. 1, and those descriptions have full force and effect with respect to the below description of process 600, and thus details on previously-described elements are omitted for the sake of brevity.

At 602, control circuitry 204 determines a notification type of the first notification. The notification type may be determined using databases stored in storage 208 of the user equipment of the user.

At 604, control circuitry 204 retrieves, from storage 208, a history of notifications of the determined notification type generated by the application. As previously mentioned, this may be a "confirmation notification."

At 606, control circuitry 204 determines, based on the history of notifications, a rate at which follow-up notifications were received from the application after receiving a notification of the determined notification type. In the case that the history of notifications is part of collaborative filtering, the history of notifications may be retrieved from a remote service accessible over communications network 314.

At 608, control circuitry 204 determines whether the rate at which follow-up notifications were received is greater than a threshold rate. If control circuitry 204 determines that the rate is greater than the threshold rate, at 610, control circuitry 204 determines that the expected event will occur at the future time. If not, the process ends at 612.

FIG. 7 is a flowchart of an illustrative process for determining the anticipated time of the expected event, in accordance with some embodiments of the disclosure. It should be noted that process 700 or any step thereof could be performed on, or provided by, any of the devices shown in FIGS. 2-3. For example, process 700 may be executed by control circuitry 204 (FIG. 2) as instructed by a media guidance application implemented on user equipment (which may have the functionality of any or all of user equipment 302, 304, and/or 306 (FIG. 3)). In addition, one or more steps of process 700 may be incorporated into or combined with one or more steps of any other process or embodiment (e.g., as described in relation to FIGS. 4-6 and 8-12). Many elements of process 700 have been described above with respect to FIG. 1, and those descriptions have full force and effect with respect to the below description of process 700, and thus details on previously-described elements are omitted for the sake of brevity.

At 702, control circuitry 204 determines a notification type of the first notification. This may be a "confirmation notification."

At 704, control circuitry 204 retrieves, from memory, a history of notifications of the determined notification type generated by the application. As mentioned previously, the history of notifications may be stored on storage 208 of the user equipment of the user, or on a remote server accessible over communications network 314.

At 706, control circuitry 204 calculates, based on the history of notifications, an average time difference (e.g., 5 minutes) between a time when an initial notification was received and a time when a follow-up notification to the initial notification was received.

At 708, control circuitry 204 determines that the anticipated time of the expected event (e.g., 4:05 pm) is a sum of the average time difference (e.g., 5 minutes) and a time when the first notification was received (e.g., 4:00 pm).

FIG. 8 is a flowchart of an illustrative process for determining the updated anticipated time of the expected event based on expected route information, in accordance with some embodiments of the disclosure. It should be noted that process 800 or any step thereof could be performed on, or provided by, any of the devices shown in FIGS. 2-3. For example, process 800 may be executed by control circuitry 204 (FIG. 2) as instructed by a media guidance application implemented on user equipment (which may have the functionality of any or all of user equipment 302, 304, and/or 306 (FIG. 3)). In addition, one or more steps of process 800 may be incorporated into or combined with one or more steps of any other process or embodiment (e.g., as described in relation to FIGS. 4-7 and 9-12). Many elements of process 800 have been described above with respect to FIG. 1, and those descriptions have full force and effect with respect to the below description of process 800, and thus details on previously-described elements are omitted for the sake of brevity.

At 802, control circuitry 204 determines that the updated information comprises expected route information. The updated information may be retrieved from media guidance data source 318 and/or a secondary source (e.g., the Internet, a remote server accessible over communications network 314).

At 804, control circuitry 204 calculates an expected travel time to navigate a route specified by the expected route information. For example, the expected travel time may be 5 minutes.

At 806, control circuitry 204 determines that the updated anticipated time of the expected event is a sum of the expected travel time and a time when the updated information was received. For example, if the updated information was received at 4:01 pm and the expected travel time is 5 minutes, the updated anticipated time of the expected event may be 4:06 pm.

Figure 9:
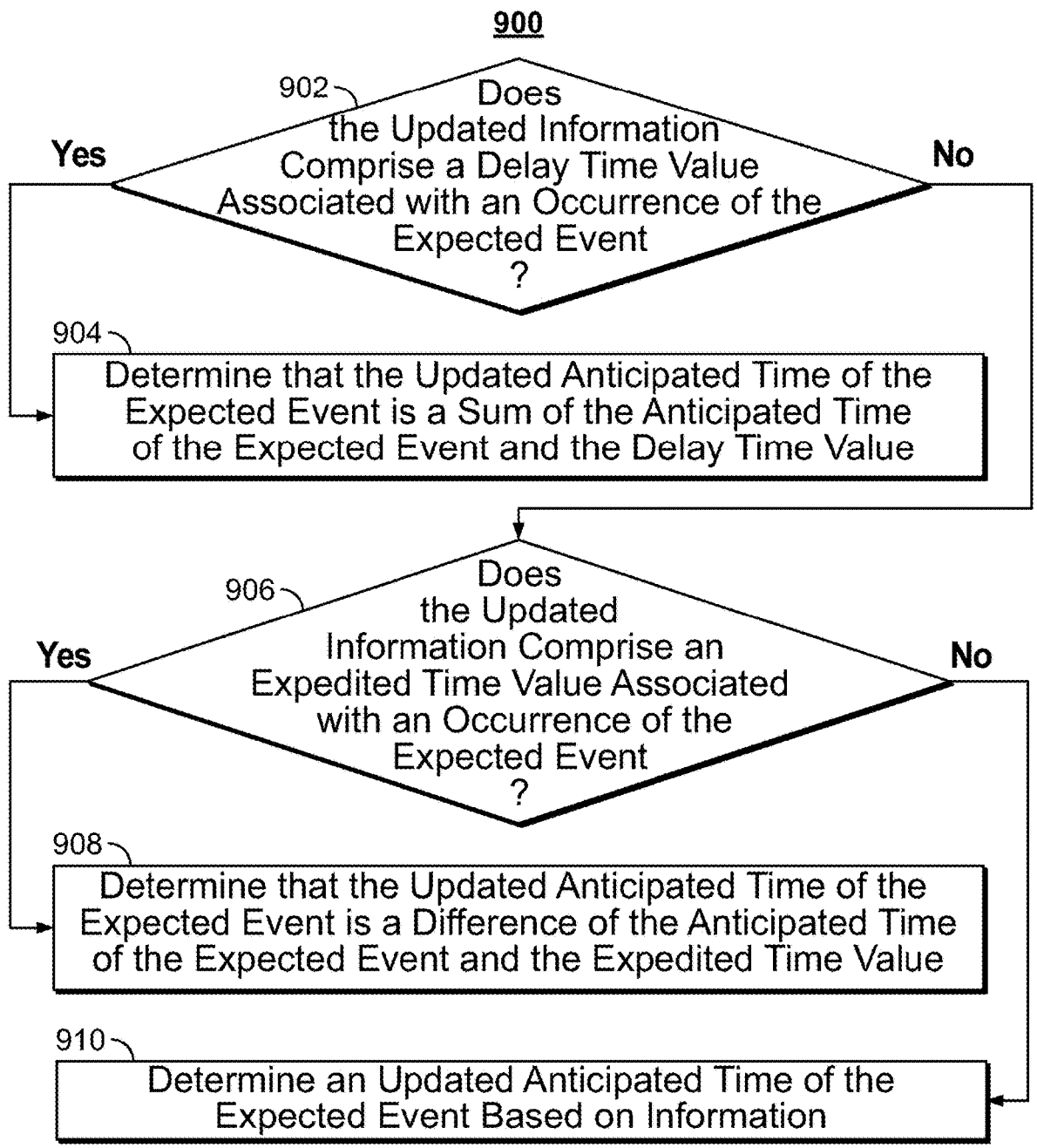
FIG. 9 is a flowchart of an illustrative process for determining the updated anticipated time of the expected event based on time adjustments, in accordance with some embodiments of the disclosure.

FIG. 9 is a flowchart of an illustrative process for determining the updated anticipated time of the expected event based on time adjustments, in accordance with some embodiments of the disclosure. It should be noted that process 900 or any step thereof could be performed on, or provided by, any of the devices shown in FIGS. 2-3. For example, process 900 may be executed by control circuitry 204 (FIG. 2) as instructed by a media guidance application implemented on user equipment (which may have the functionality of any or all of user equipment 302, 304, and/or 306 (FIG. 3)). In addition, one or more steps of process 900 may be incorporated into or combined with one or more steps of any other process or embodiment (e.g., as described in relation to FIGS. 4-8 and 10-12). Many elements of process 900 have been described above with respect to FIG. 1, and those descriptions have full force and effect with respect to the below description of process 900, and thus details on previously-described elements are omitted for the sake of brevity.

At 902, control circuitry 204 determines whether the updated information comprises a delay time value associated with an occurrence of the expected event. As mentioned previously, the updated information may be retrieved from media guidance data source 318 and/or a secondary source (e.g., the Internet, a remote server accessible over communications network 314, etc.).

If control circuitry 204 determines that the updated information comprises a delay time value, at 904, control circuitry 204 determines that the updated anticipated time of the expected event is a sum of the anticipated time of the expected event and the delay time value.

If not, at 906, control circuitry 204 determines whether the updated information comprises an expedited time value associated with an occurrence of the expected event. If control circuitry 204 determines that the updated information comprises an expedite time value, control circuitry 204 determines that the updated anticipated time of the expected event is a difference of the anticipated time of the expected event and the expedited time value at 908.

If the updated information does not comprise a delay time value or an expedited time value, at 910, control circuitry 204 determines an updated anticipated time of the expected event based on the original information extracted from the first notification. In some embodiments, the first notification may update its content automatically (e.g., the first notification is a timer).

Figure 10:
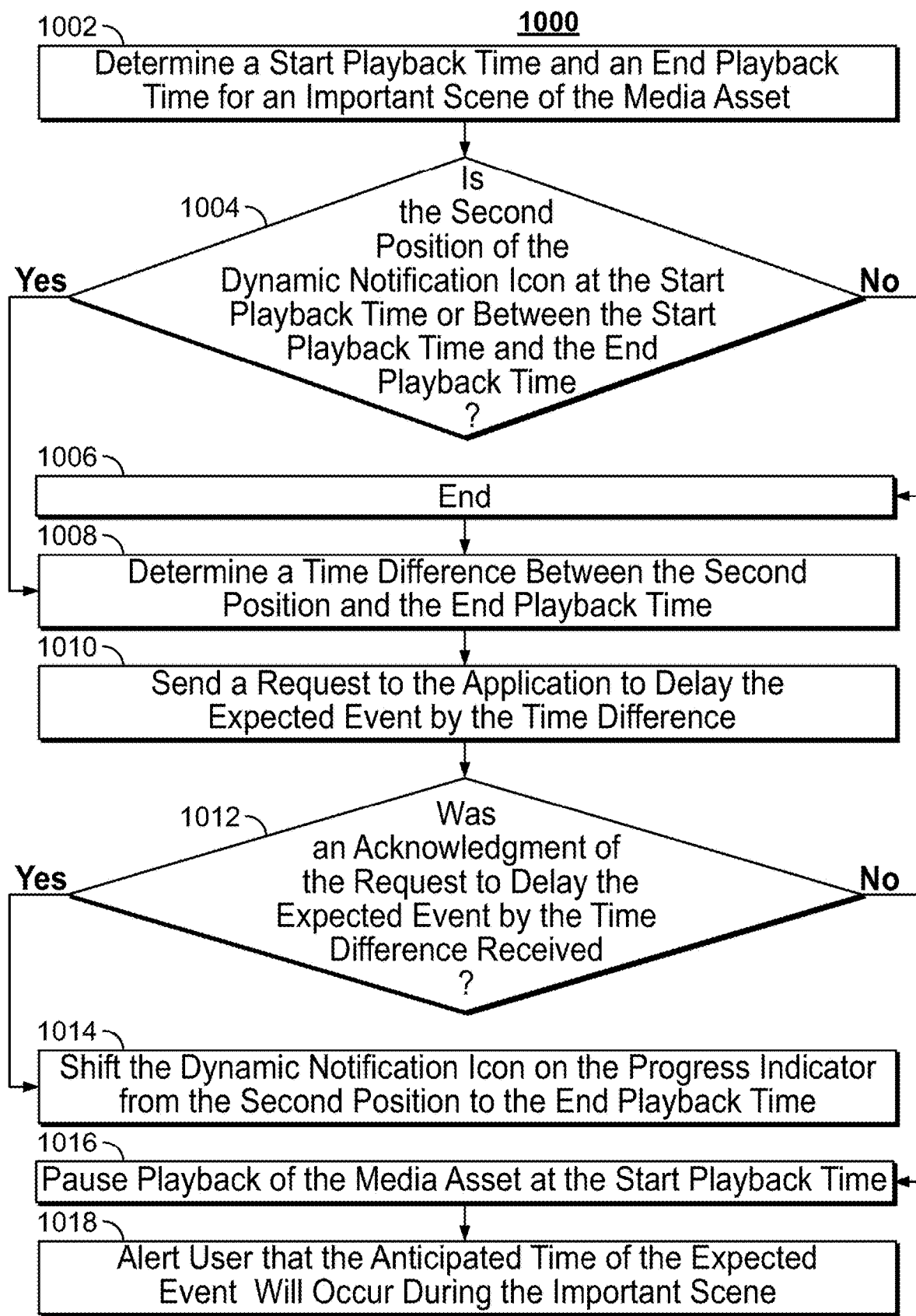
FIG. 10 is a flowchart of an illustrative process for sending a request to delay an expected event in response to determining that the user is viewing an important scene, in accordance with some embodiments of the disclosure.

FIG. 10 is a flowchart of an illustrative process for sending a request to delay an expected event in response to determining that the user is viewing an important scene, in accordance with some embodiments of the disclosure. It should be noted that process 1000 or any step thereof could be performed on, or provided by, any of the devices shown in FIGS. 2-3. For example, process 1000 may be executed by control circuitry 204 (FIG. 2) as instructed by a media guidance application implemented on user equipment (which may have the functionality of any or all of user equipment 302, 304, and/or 306 (FIG. 3)). In addition, one or more steps of process 1000 may be incorporated into or combined with one or more steps of any other process or embodiment (e.g., as described in relation to FIGS. 4-9 and 11-12). Many elements of process 1000 have been described above with respect to FIG. 1, and those descriptions have full force and effect with respect to the below description of process 1000, and thus details on previously-described elements are omitted for the sake of brevity.

At 1002, control circuitry 204 determines a start playback time and an end playback time for an important scene of the media asset. This determination may be based on metadata retrieved from media guidance data source 318.

At 1004, control circuitry 204 determines whether the second position of the dynamic notification icon is at the start playback time or between the start playback time and the end playback time. If control circuitry 204 determines that the second position of the dynamic notification icon is not at the start playback time or not between the start playback time and the end playback time, the process ends at 1006.

If control circuitry 204 determines that the second position of the dynamic notification icon is at the start playback time or between the start playback time and the end playback time, at 1008, control circuitry 204 determines a time difference between the second position and the end playback time.

At 1010, control circuitry 204 sends a request to the application to delay the expected event by the time difference. The request may be sent from the user equipment of the user via I/O Path 202 over communications network 314.

At 1012, control circuitry 204 determines whether an acknowledgment of the request to delay the expected event by the time difference was received. For example, control circuitry 204 may monitor I/O Path 202 for an acknowledgment (e.g., may be received over communications network 314).

If control circuitry 204 determines that the acknowledgement was received, at 1014, control circuitry 204 shifts the dynamic notification icon on the progress indicator from the second position to the end playback time (e.g., on user input interface 210 of display 212).

If control circuitry 204 determines that the acknowledgement was not received, at 1016, control circuitry 204 pauses playback of the media asset at the start playback time.

At 1018, control circuitry 204 alerts user that the anticipated time of the expected event will occur during the important scene. The alert may be generated for display on user input interface 210.

Figure 11:
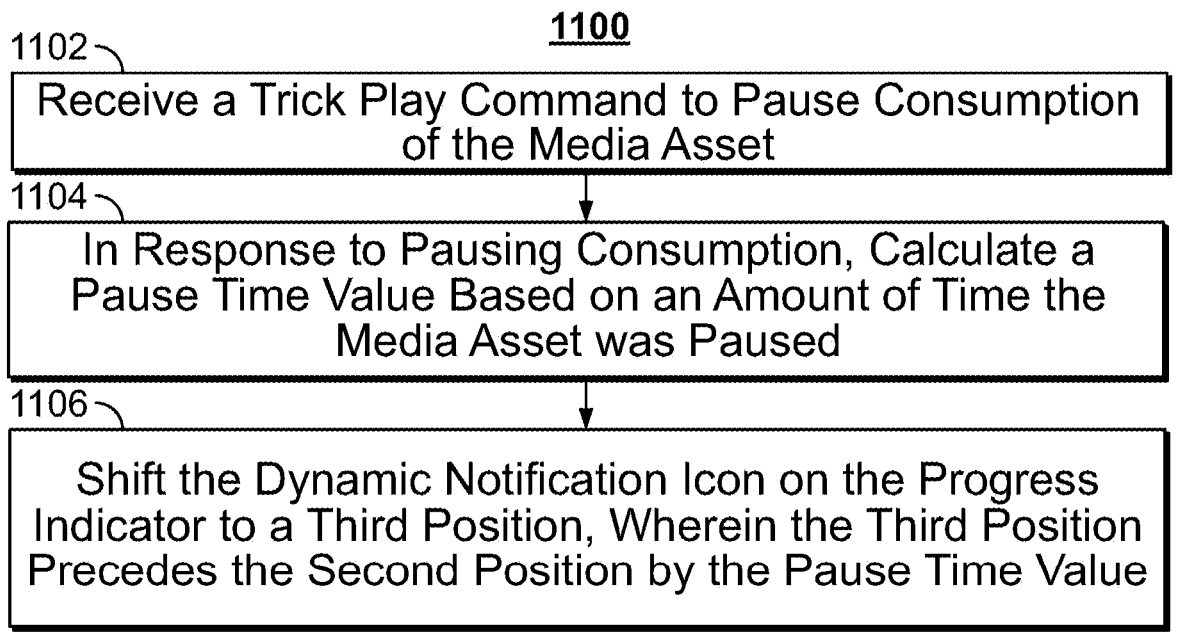
FIG. 11 is a flowchart of an illustrative process for shifting the dynamic notification icon based on a trick play command, in accordance with some embodiments of the disclosure.

FIG. 11 is a flowchart of an illustrative process for shifting the dynamic notification icon based on a trick play command, in accordance with some embodiments of the disclosure. It should be noted that process 1100 or any step thereof could be performed on, or provided by, any of the devices shown in FIGS. 2-3. For example, process 1100 may be executed by control circuitry 204 (FIG. 2) as instructed by a media guidance application implemented on user equipment (which may have the functionality of any or all of user equipment 302, 304, and/or 306 (FIG. 3)). In addition, one or more steps of process 1100 may be incorporated into or combined with one or more steps of any other process or embodiment (e.g., as described in relation to FIGS. 4-10 and 12). Many elements of process 1100 have been described above with respect to FIG. 1, and those descriptions have full force and effect with respect to the below description of process 1100, and thus details on previously-described elements are omitted for the sake of brevity.

At 1102, control circuitry 204 receives a trick play command to pause consumption of the media asset. In some embodiments, the trick play command may be to rewind, forward, enter slow motion, etc.

At 1104, in response to pausing consumption, control circuitry 204 calculates a pause time value based on an amount of time the media asset was paused. For example, the user may pause for 5 minutes.

At 1106, control circuitry 204 shifts the dynamic notification icon on the progress indicator to a third position, wherein the third position precedes the second position by the pause time value (e.g., shifted 5 minutes before the second position). The shift may be displayed on user input interface 210 of display 212.

Figure 12:
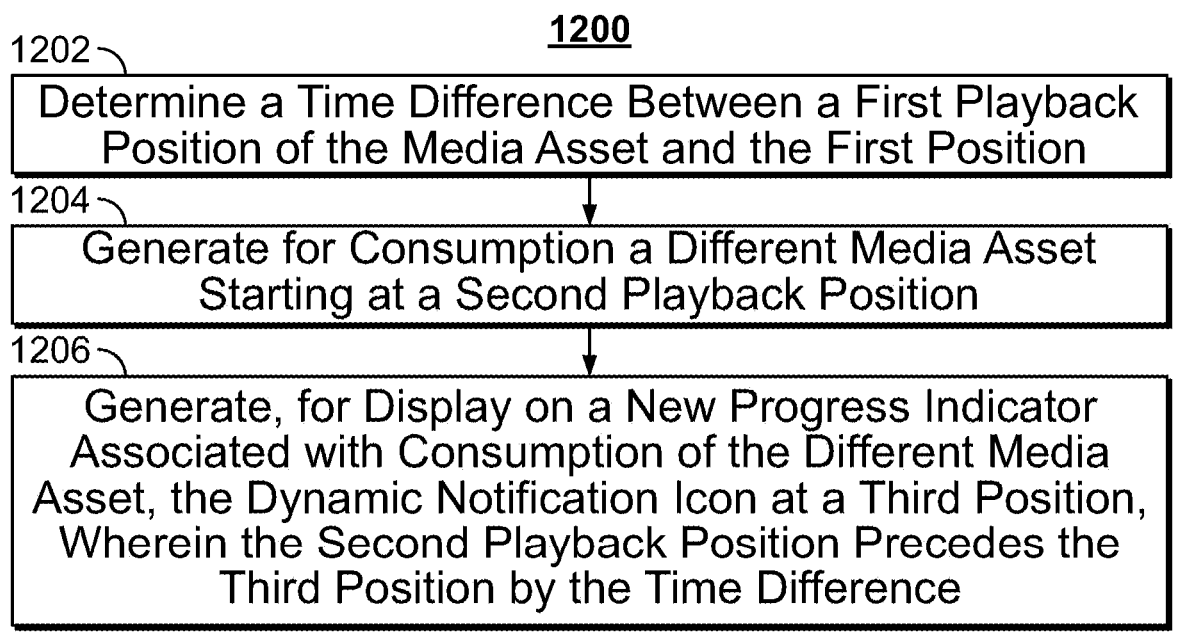
FIG. 12 is a flowchart of an illustrative process for shifting the dynamic notification icon based on the consumption of a different media asset, in accordance with some embodiments of the disclosure.

FIG. 12 is a flowchart of an illustrative process for shifting the dynamic notification icon based on the consumption of a different media asset, in accordance with some embodiments of the disclosure. It should be noted that process 1200 or any step thereof could be performed on, or provided by, any of the devices shown in FIGS. 2-3. For example, process 1200 may be executed by control circuitry 204 (FIG. 2) as instructed by a media guidance application implemented on user equipment (which may have the functionality of any or all of user equipment 302, 304, and/or 306 (FIG. 3)). In addition, one or more steps of process 1200 may be incorporated into or combined with one or more steps of any other process or embodiment (e.g., as described in relation to FIGS. 4-11). Many elements of process 1200 have been described above with respect to FIG. 1, and those descriptions have full force and effect with respect to the below description of process 1200, and thus details on previously-described elements are omitted for the sake of brevity.

At 1202, control circuitry 204 determines a time difference between a first playback position of the media asset and the first position. For example, the time difference may be 5 minutes.

At 1204, control circuitry 204 generates for consumption a different media asset starting at a second playback position. The different media asset may be retrieved from media content source 316, or may be stored locally on storage 208 of the user equipment of the user.

At 1206, control circuitry 204 generates, for display on a new progress indicator associated with consumption of the different media asset, the dynamic notification icon at a third position, wherein the second playback position precedes the third position by the time difference (e.g., 5 minutes). The new progress indicator may be displayed on display 212 of a different user equipment device, or the same one as the user equipment device the user is accessing (e.g., through split screen, overlay, or replacement of the progress indicator of the media asset).

It is contemplated that the steps or descriptions of each of FIGS. 4-12 may be used with any other embodiment of this disclosure. In addition, the steps and descriptions described in relation to FIGS. 4-12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-3 could be used to perform one or more of the steps in FIGS. 4-12.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
generating a video game for consumption;
receiving, from another application, a notification during consumption of the video game, wherein the notification comprises: (a) an identification of an expected event, and (b) a real-time anticipated time of the expected event;
identifying an expected progression point within the video game that is expected to be reached by a user at the real-time anticipated time of the expected event;

generating for display within the video game, a dynamic notification, wherein the dynamic notification comprises: (a) the identification of the expected event and (b) an identified expected progression point within the video game that is expected to be reached by the user at the real-time anticipated time of the expected event.

2. The method of claim 1, wherein generating the video game for consumption further comprises generating for display a progress indicator overlaid over the video game, wherein the progress indicator is an indication of a user's progress within the video game.

3. The method of claim 2, wherein the progress indicator is a visual monitor that informs the user of how much of the video game the user has completed.

4. The method of claim 2, wherein the video game is a racing game, and wherein the progress indicator is a visual indicator of the user's race measured in laps.

5. The method of claim 4, wherein the dynamic notification is generated for display on a mini map displaying laps of a video game race.

6. The method of claim 5, wherein the dynamic notification is located relative to a lap of the video game race the user will be on when the expected event is anticipated to occur.

7. The method of claim 1, wherein the identifying the expected progression point within the video game further comprises determining an amount of time the user is expected to take to complete a portion of the video game.

8. The method of claim 7, wherein the portion of the video game is one of a portion of a lap in a race, the lap in the race, the race, a level, and a mission.

9. The method of claim 7, wherein the amount of time the user is expected to take to complete the portion may be a progression speed.

10. The method of claim 9, wherein the progression speed represents how quickly the user typically progresses through the video game.

11. A system comprising:
control circuitry configured to:
generate a video game for consumption;
receive, from another application, a notification during consumption of the video game, wherein the notification comprises: (a) an identification of an expected event, and (b) a real-time anticipated time of the expected event;
identify an expected progression point within the video game that is expected to be reached by a user at the real-time anticipated time of the expected event;
generate a dynamic notification, wherein the dynamic notification comprises: (a) the identification of the expected event and (b) an identified expected progression point within the video game that is expected to be reached by the user at the real-time anticipated time of the expected event; and
display circuitry configured to:
generate the dynamic notification for display within the video game.

12. The system of claim 11, wherein the display circuitry is further configured to generate for display a progress indicator overlaid over the video game, wherein the progress indicator is an indication of a user's progress within the video game.

13. The system of claim 12, wherein the progress indicator is a visual monitor that informs the user of how much of the video game the user has completed.

14. The system of claim 12, wherein the video game is a racing game, and wherein the progress indicator is a visual indicator of the user's race measured in laps.

15. The system of claim 14, wherein the display circuitry is further configured to generate for display the dynamic notification on a mini map displaying laps of a video game race.

16. The system of claim 15, wherein the display circuitry is further configured to locate the dynamic notification relative to a lap of the video game race the user will be on when the expected event is anticipated to occur.

17. The system of claim 11, wherein the control circuitry is further configured to, when identifying the expected progression point within the video game, determine an amount of time the user is expected to take to complete a portion of the video game.

18. The system of claim 17, wherein the portion of the video game is one of a portion of a lap in a race, the lap in the race, the race, a level, and a mission.

19. The system of claim 17, wherein the amount of time the user is expected to take to complete the portion may be a progression speed.

20. The system of claim 19, wherein the progression speed represents how quickly the user typically progresses through the video game.

* * * * *